US010673717B1

(12) United States Patent
Perevalov et al.

(10) Patent No.: US 10,673,717 B1
(45) Date of Patent: Jun. 2, 2020

(54) MONITORING NETWORKED DEVICES

(71) Applicant: Amazon Technologies, Inc., Reno, NV (US)

(72) Inventors: Oleg Perevalov, Seattle, WA (US); Arthur Myer, Seattle, WA (US); Shinji Anzai, Tokyo (JP)

(73) Assignee: Amazon Technologies, Inc., Seattle, WA (US)

( * ) Notice: Subject to any disclaimer, the term of this patent is extended or adjusted under 35 U.S.C. 154(b) by 1227 days.

(21) Appl. No.: 14/083,384

(22) Filed: Nov. 18, 2013

(51) Int. Cl.
*H04L 12/26* (2006.01)
*H04L 12/24* (2006.01)

(52) U.S. Cl.
CPC .................................. *H04L 43/062* (2013.01)

(58) Field of Classification Search
CPC ......... H04L 41/08; H04L 61/20; H04L 41/12; H04L 45/02; H04L 41/20
USPC ................................................... 370/254, 252
See application file for complete search history.

(56) References Cited

U.S. PATENT DOCUMENTS

| | | | | |
|---|---|---|---|---|
| 6,052,819 | A * | 4/2000 | Barker | H04L 29/06 370/469 |
| 7,496,685 | B2 * | 2/2009 | Chen | H04L 12/4625 709/203 |
| 2003/0177224 | A1 * | 9/2003 | Nguyen | G06F 11/2035 709/224 |
| 2004/0095897 | A1 * | 5/2004 | Vafaei | H04L 29/06 370/254 |
| 2005/0005105 | A1 * | 1/2005 | Brown | G06F 21/305 713/165 |
| 2006/0091999 | A1 * | 5/2006 | Howarth | G06K 17/00 340/10.3 |
| 2007/0237072 | A1 * | 10/2007 | Scholl | H04L 12/66 370/222 |
| 2012/0101639 | A1 * | 4/2012 | Carralero | G06F 1/26 700/286 |

(Continued)

OTHER PUBLICATIONS

Delta Power, Inc., "Automatic Transfer Switch Maintenance", 1 page, Nov. 19, 2013.

(Continued)

*Primary Examiner* — Tonia L Dollinger
*Assistant Examiner* — Jonathan A Sparks
(74) *Attorney, Agent, or Firm* — Robert C. Kowert; Kowert, Hood, Munyon, Rankin & Goetzel, P.C.

(57) ABSTRACT

One or more programs of instruction configure networking-enabled electronic devices to communicate in a ring communication network with a network controller. One or more startup files in one or more devices are configured to enable IP Forwarding, local system monitoring, and signal transmission processes on device startup. Data packets are sent from the network controller to each device coupled to the ring network, where each device processes a separate data packet to configure itself for ring network communication using IP Forwarding. Monitoring devices over a ring network includes using receipt of signals to determine if one or more devices have dropped from the network, modifying IP Forwarding by one or more devices on the network to compensate for a device dropping out, receiving data associated with one or more device parameters, launching one or more read-only interfaces providing device data, and updating various device elements over the network.

20 Claims, 17 Drawing Sheets

(56) References Cited

U.S. PATENT DOCUMENTS

2015/0003282 A1\* 1/2015 Gourlay .............. H04L 41/0806
370/254
2015/0074246 A1\* 3/2015 Premji ................ H04L 41/0886
709/220

OTHER PUBLICATIONS

APC, "Rack-Mount Transfer Switches", pp. 1-2, Nov. 19, 2013.
CCM-T Instruction Sheet, "Automatic Transfer Switch FT-10 Network Control Communications Module (CCM-T) Kit 541-0811", pp. 1-14, 2003.
U.S. Appl. No. 14/083,385, filed Nov. 18, 2013, Oleg Perevalov.

\* cited by examiner

| Out-Plug Pin-Outs | | |
|---|---|---|
| 1 | Connects To | Dev. Plug Pin 1 |
| 2 | Connects To | Dev. Plug Pin 2 |
| 3 | Connects To | In-Plug Pin 3 |
| 4 | No Connection | |
| 5 | No Connection | |
| 6 | Connects To | In-Plug Pin 6 |
| 7 | No Connection | |
| 8 | No Connection | |

*FIG. 10*

| In-Plug Pin-Outs | | |
|---|---|---|
| 1 | Connects To | Dev. Plug Pin 3 |
| 2 | Connects To | Dev. Plug Pin 6 |
| 3 | Connects To | Out-Plug Pin 3 |
| 4 | No Connection | |
| 5 | No Connection | |
| 6 | Connects To | Out-Plug Pin 6 |
| 7 | No Connection | |
| 8 | No Connection | |

*FIG. 11*

| Dev. Plug Pin-Outs | | |
|---|---|---|
| 1 | Connects To | Out-Plug Pin 1 |
| 2 | Connects To | Out-Plug Pin 2 |
| 3 | Connects To | In-Plug Pin 1 |
| 4 | No Connection | |
| 5 | No Connection | |
| 6 | Connects To | In-Plug Pin 2 |
| 7 | No Connection | |
| 8 | No Connection | |

*FIG. 12*

| Terminator Connector Pin-Outs | | |
|---|---|---|
| 1 | Connects To | Terminator Pin 3 |
| 2 | Connects To | Terminator Pin 6 |
| 3 | Connects To | Terminator Pin 1 |
| 4 | No Connection | |
| 5 | No Connection | |
| 6 | Connects To | Terminator Pin 2 |
| 7 | No Connection | |
| 8 | No Connection | |

*FIG. 13*

MONITORING NETWORKED DEVICES

BACKGROUND

Organizations such as on-line retailers, cloud computing providers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 110 volts). A network of cabling, bus bars, power connectors, and power distribution units, is used to deliver the power at the lower voltage to numerous specific components in the facility.

Some systems include dual power servers that provide redundant power for computing equipment. In some systems, an automatic transfer switch ("ATS") device provides switching from a primary power system to a secondary (e.g., back-up) power system. In a typical system, the automatic transfer switch automatically switches the computing equipment to the secondary system upon detecting a fault in the primary power. To maintain the computing equipment in continuous operation, the automatic transfer switch may need to make the transfer to secondary power system rapidly (for example, within about 16 milliseconds).

In some systems, if the ATS device coupled to a rack system fails (for example, due to an overcurrent condition in the automatic transfer switch), the system may no longer be able to automatically switch to back-up power during a primary system failure. Monitoring and maintenance of ATS devices thereby can mitigate risks of such a loss of capability.

In some cases, ATS devices, as well as various other devices in a data center, may be physically monitored and manually maintained by technicians at the data center. For an organization that operates multiple data center devices, such as ATS devices, at multiple locations, such as multiple data centers, monitoring and maintaining all of the devices may require multiple technicians for the multiple locations and may be time-consuming, due to the quantity and distribution of the devices.

Furthermore, where a finite number of technicians are available, monitoring of a given device may occur infrequently, occasionally, etc. For example, an ATS device may be tested and monitored during installation of a new rack computing system, but otherwise may simply be visually inspected at other times. In addition, in some data centers, devices such as ATS devices may be installed underneath a raised floor, making visual inspection more difficult.

In some cases, maintenance is performed manually on a data center device, such as an ATS device. As a result, maintenance, such as firmware upgrades, may need to be implemented on each device one-by-one. For an organization that operates multiple data center devices at multiple locations, such manual maintenance may be time-consuming and costly.

In addition, with regard to many data center devices, such as ATS devices, health issues with an individual device, such as performance losses, absent physical monitoring by a physically-present technician, may become evident to a technician until the device fails to perform one or more functions, at which point an alarm may be generated from a device in a rack computing system, such as a Top of Rack ("TOR") switch. Such an alarm may indicate a general performance issue associated with the rack computing system but may not indicate with particularity the nature of the failure, nor the particular cause, such that a technician arriving at the rack computing system may be required to manually access the failing device to diagnose the cause of the failure.

BRIEF DESCRIPTION OF THE DRAWINGS

FIG. 10, FIG. 11, FIG. 12 and FIG. 13 are tables illustrating one embodiment of pinouts on various network interfaces of a network dongle and terminator.

Figure 1:
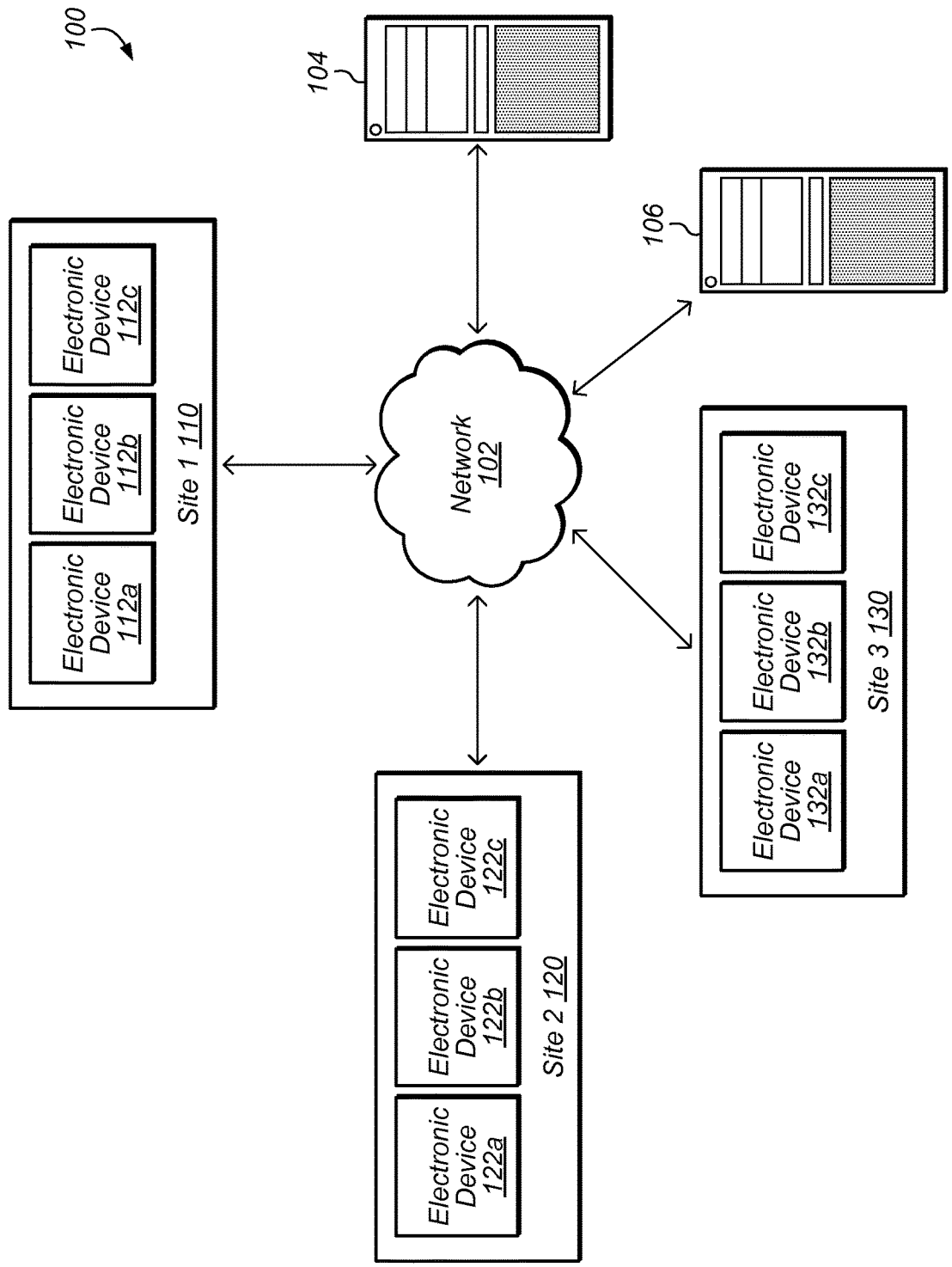
FIG. 1 is a block diagram illustrating one embodiment of a system that communicatively couples ATS devices at multiple data centers through a communication network.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of systems and methods communicatively coupling networking-enabled electronic devices to a communication network and enabling interactions with the electronic devices via the network are described. According to one embodiment, a data center includes multiple ATS devices, a network gateway device, and a loop cable assembly. The ATS devices switch between power sources to provide power to rack computing systems. The network gateway device communicatively couples each ATS device to a remote computing device through a communication network. The loop cable assembly communicatively couples each ATS device in series to the network gateway device. The loop cable assembly enables each of the coupled ATS devices to communicate data to the network gateway device, which can further be provided to the remote computing device through the communication network. The loop cable assembly enables forwarding of data received at a particular ATS device from another ATS device separately coupled to the loop cable assembly to the network gateway device, via separate portions of the loop cable assembly. The loop cable assembly includes a network cable and a network dongle. The network cable is communicatively coupled to the network gateway device. The network dongle includes an input jack that couples with one end of the network cable and receives input data from the network gateway device through the network cable, a plug that couples with an ATS device and provides the input data to the ATS device and receives output data from the ATS device, and an output jack that provides the output data to the network gateway device.

According to one embodiment, an apparatus includes an input network connector, a device network connector, and an output network connector. The input network connector receives incoming communications from at least a network controller via a network connection. The device network connector is communicatively coupled with the input network connector via an input pathway cable and with a networking-enabled electronic device. The device network connector provides the incoming communications from the input pathway cable to the electronic device and receives outgoing communications from the electronic device. The output network connector is communicatively coupled with the device network connector via an output pathway cable and provides the outgoing communications from the output pathway cable to the network controller via another network connection.

According to one embodiment, a method includes coupling networking-enabled electronic devices in series to a loop cable assembly and coupling a network gateway device to the loop cable assembly in series with the electronic devices. The loop cable assembly enables each of the electronic devices to communicate data to the network gateway device and enables forwarding of data received at a particular electronic device from another electronic device separately coupled to the loop cable assembly to the network gateway device, via separate portions of the loop cable assembly.

According to one embodiment, a method of configuring ATS devices to communicate data over a communication network having a ring topology, wherein each of the electronic devices are coupled in series with each other via the communication network, includes assigning a separate static Internet Protocol (IP) address to each ATS device and loading, into a persistent memory of each ATS device, at least one program of instructions executable by the ATS device to configure at least one startup file of the ATS device to enable IP Forwarding, and configure at least one startup file of the ATS device to transmit signals, based at least in part upon a predetermined trigger, to a network gateway device through the communication network. Configuring the startup file to enable IP Forwarding configures the ATS device to forward received data packets to at least one next-hop IP address associated with another device coupled to the ATS device in series via the communication network. Loading the program of instructions into the persistent memory of each ATS device configures the ATS device to restore IP Forwarding and transmission of signals in response to a re-boot of the ATS device.

According to one embodiment, a computing device includes a network interface configured to communicatively couple with a communication network, one or more processors, and a persistent memory configured to store a program of instructions. When executed by the one or more processors, the program of instructions cause the computing device to configure at least one local startup file to enable Network Forwarding and configure at least one local startup file to enable local monitoring of at least one operating parameter of the computing device and transmission of one or more signals to a network controller via the communication network. Network Forwarding can include forwarding data communications received at the network interface over the communication network to another device over the communication network. In some embodiments, Network Forwarding includes IP Forwarding, which may involve forwarding data communications using IP addresses. Loading the program of instructions into the persistent memory of the computing device configures the computing device to restore Network Forwarding, local monitoring, and transmission of signals in response to a re-boot of the computing device.

According to one embodiment, a computing device includes a network interface configured to communicatively couple in series with a plurality of networking-enabled electronic devices over a communication network that has a ring topology, one or more processors, and a persistent memory configured to store a program of instructions. When executed by the one or more processors, the program of instructions cause the computing device to assign an Internet Protocol (IP) address to each electronic device in the communication network, generate, for each electronic device, a separate data packet comprising a program of instructions, and transmit each of the separate data packets to the corresponding electronic devices over the communication network to configure each corresponding electronic device to communicate with the computing device over the communication network. Each separate program of instructions, when executed by each electronic device, cause the electronic device to locally associate the electronic device with the respective assigned IP address and configure local IP Forwarding to forward data communications to a next-hop IP address specified by the data packet.

As used herein, a "cable" includes any cable, conduit, or line that carries one or more conductors and that is flexible over at least a portion of its length. A cable may include a connector portion (also referred to herein as a "connector"), such as a plug, jack, etc., at one or more of its ends.

As used herein, "computing" includes any operations that can be performed by a computer, computing device or processor, such as computation, data storage, data retrieval, or communications.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, "load", includes the output of a power infrastructure and the electrical power consumed by some or all of the power infrastructure, including the output. For example, a load in a power infrastructure may include a computing facility that consumes power distributed over the power infrastructure from a power source.

As used herein, a "module" is a component or a combination of components. A module may include functional elements and systems, such as computer systems, circuit boards, racks, blowers, ducts, and power distribution units, as well as structural elements, such a base, frame, housing, or container.

As used herein, "reserve power" and "backup power" may refer interchangeably to power that can be supplied to an electrical load upon the failure of, or as a substitute for, primary power to the load. For example, a power feed from a backup generator may include backup power.

As used herein, "signal" includes an electrical or electromagnetic impulse, wave, tone, pulse, or combination thereof. A signal may serve to indicate, identify, inform, direct, instruct, command, or warn. A signal may be a discrete set of information (for example, a sequence of characters in a message), continuous (such as a wave), periodic, or a combination thereof. A signal may have any of various regular or irregular characteristics. In some embodiments, a signal includes a data packet.

As used herein, "switching device", "switch", etc. includes an electrical switch that can break an electrical current. A switching device can interrupt a power flow, divert one of the source or output of a power feed, etc. For example, a switching device may selectively route a power feed from one of two or more sources to a single output.

In various embodiments, networking loop cable assembly enables multiple networking-enabled electronic devices to be coupled in series with each other and with a network gateway device to form a local communication network having a ring topology. Such a ring network of devices enables each of the electronic devices to be interacted with via one or more other devices, over at least the local communication network, using a single network gateway device and cables. The electronic devices can be configured to communicate over the local ring network, and can further be configured, through loading particular programs of instruction into persistent memory of each device, to establish monitoring and ring network communication abilities and restore same after a device re-boot.

FIG. 1 is a block diagram illustrating one embodiment of a system that communicatively couples ATS devices at multiple sites through a communication network. The system 100 includes one or more sites 110, 120, 130, a network device management computer 104, one or more remote computers 106 associated with one or more operators, technicians, etc., which are all coupled to a communication network 102. Each site 110, 120, 130 respectively includes networking-enabled electronic devices 112*a-c*, 122*a-c*, and 132*a-c*. Each site may be located in a different geographic location from one or more other of the sites. One or more of the sites may comprise a data center. In some embodiments, one or more of the networking-enabled electronic devices (also referred to interchangeably hereinafter as "electronic devices") comprises an ATS device.

For illustrative purposes, three sites 110, 120, 130 are shown in FIG. 1. The number of sites including devices coupled to network 102 may, however, vary from embodiment to embodiment (and, within a given embodiment, from system to system). In addition, the number of any of the illustrated networking-enabled electronic devices in each site in FIG. 1 may vary from embodiment to embodiment (and, within a given embodiment, from location to location).

In some embodiments, one or more devices located in various sites are coupled to a communication network to enable one or more of monitoring and maintenance from a remote computer system. For example, in the illustrated embodiment, where site 110 includes devices 112a-c, site 120 includes devices 122a-c, and site 130 includes devices 132a-c, each of the devices may be coupled to network 102, which may communicatively couple each device to one or more network device management computers 104 that can monitor one or more of the devices over the network 102, perform various device maintenance functions over the network 102, etc. For example, computer 104 may be configured to pull data associated with one or more device parameters associated with each device from the respective devices and process the data to determine the current health of each the various devices. In another example, each device may be configured to push such data to the computer 104 over the network 102. Such remote monitoring through network communication can enable device monitoring that reduces cost and time with respect to physical monitoring, particularly where the devices are distributed across multiple disparate locations.

In some embodiments, computer 104 is configured to act on the data; such an action may include performing one or more acts of maintenance on one or more devices, alerting one or more operators to physically perform various particular maintenance functions, etc. For example, where the computer 104, based upon received data, determines that devices 112a-c each require a firmware upgrade, the computer 104 can upgrade each device remotely over network 102. In another example, where the computer 104, based upon received data, determines that device 132b is experiencing a particular performance loss, the computer 104 may send a message to a remote computer 106 supporting one or more operators, technicians, etc. associated with one or more of the sites to perform one or more particular acts of maintenance on device 132b to remedy the loss. Such interaction with devices, technicians, and the like over the network 102 can enable quick and effective maintenance of multiple distributed devices with respect to manual maintenance of individual devices.

Figure 2:
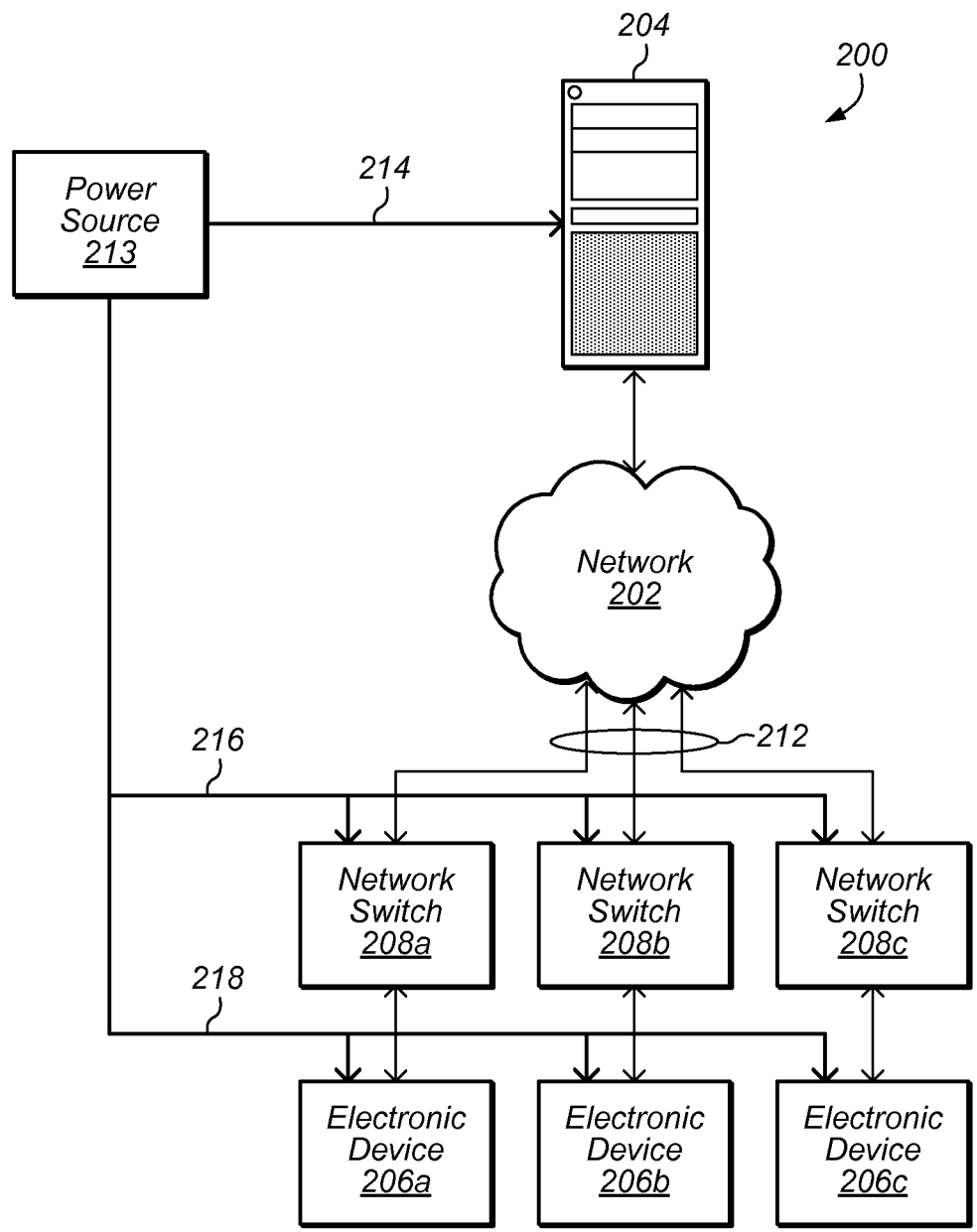
FIG. 2 is a block diagram illustrating one embodiment of a system that communicatively couples multiple ATS devices to a central computing device through individual communication network switch devices.

FIG. 2 is a block diagram illustrating one embodiment of a system that communicatively couples multiple ATS devices to a central computing device through individual communication network switch devices. The system 200, which can be included in one or more locations, including one or more data centers, includes a network 202, a network device management computer 204, networking-enabled electronic devices 206a-c, and network switch devices 208a-c, and a power source 213.

In some embodiments, one or more networking-enabled electronic devices can be communicatively coupled to a communication network, as generally illustrated above with reference to FIG. 1, directly through a network switch. For example, in the illustrated embodiment, each electronic device 206a-c, which can, in some embodiments, include one or more ATS devices, is communicatively coupled to network 202 via a separate corresponding network switch 208a-c over a plurality of separate pathways 212. In some embodiments, an ATS device may include a DELTA® brand ATS. It will be understood that, in some embodiments, one or more network switches may each communicatively couple multiple electronic devices to a network 202. In some embodiments, the network switches 208 are coupled to a network gateway device (not illustrated) which is itself coupled to the network 202. For example, where network switches 208 and devices 206 are part of a local network, which may include a Local Area Network (LAN), and network 202 may include a Wide Area Network (WAN), a network gateway device may communicatively couple one or more devices of the LAN, such as the one or more of the network switches, to the WAN.

As shown in the illustrated embodiment, where a network switch couples an electronic device to a network, a network device management computer 204 can interact with each coupled electronic device over the network 202 in a similar manner as described above with reference to FIG. 1. For example, computer 204 may monitor one or more parameters associated with each device 206a-c via network 202, using one or more of a push or pull architecture to collect data associated with such parameters, and the computer 204 may further perform maintenance, send communications, etc. regarding one or more electronic devices based at least in part upon one or more triggers, including analysis of data received over network 202.

In some embodiments, coupling one or more electronic devices to a network via one or more network switch devices can impose additional costs on an organization responsible for such electronic devices. For example, as shown in the illustrated embodiment, while both computer 204 and devices 206a-c require power feeds 214, 218 to operate, the network switch devices 208a-c also require power to operate necessitating additional power feeds 216 to those devices. Such power feeds may be cumbersome and difficult to deploy in certain locations. In addition, the additional power required by the network switch devices 208a-c imposes additional costs and also imposes additional power requirements on the power source.

Furthermore, each network switch device itself, which may comprise a network gateway device, is costly, both in terms of initial expenditure to acquire and install the network switch device and in terms of monitoring and maintaining the network switch device in addition to the other electronic devices. Such costs may be significant for an organization responsible for one or more of a large quantity of electronic devices and electronic devices distributed across multiple locations. For example, where an organization is responsible for a large quantity of electronic devices across a large number of geographically-remote locations, including multiple separate data centers, communicatively coupling all of the devices to a network as illustrated in FIG. 2 may require a large quantity of network switch devices, the cost for which may prove sufficiently exorbitant to outweigh the costs saved through networking the devices.

Figure 3:
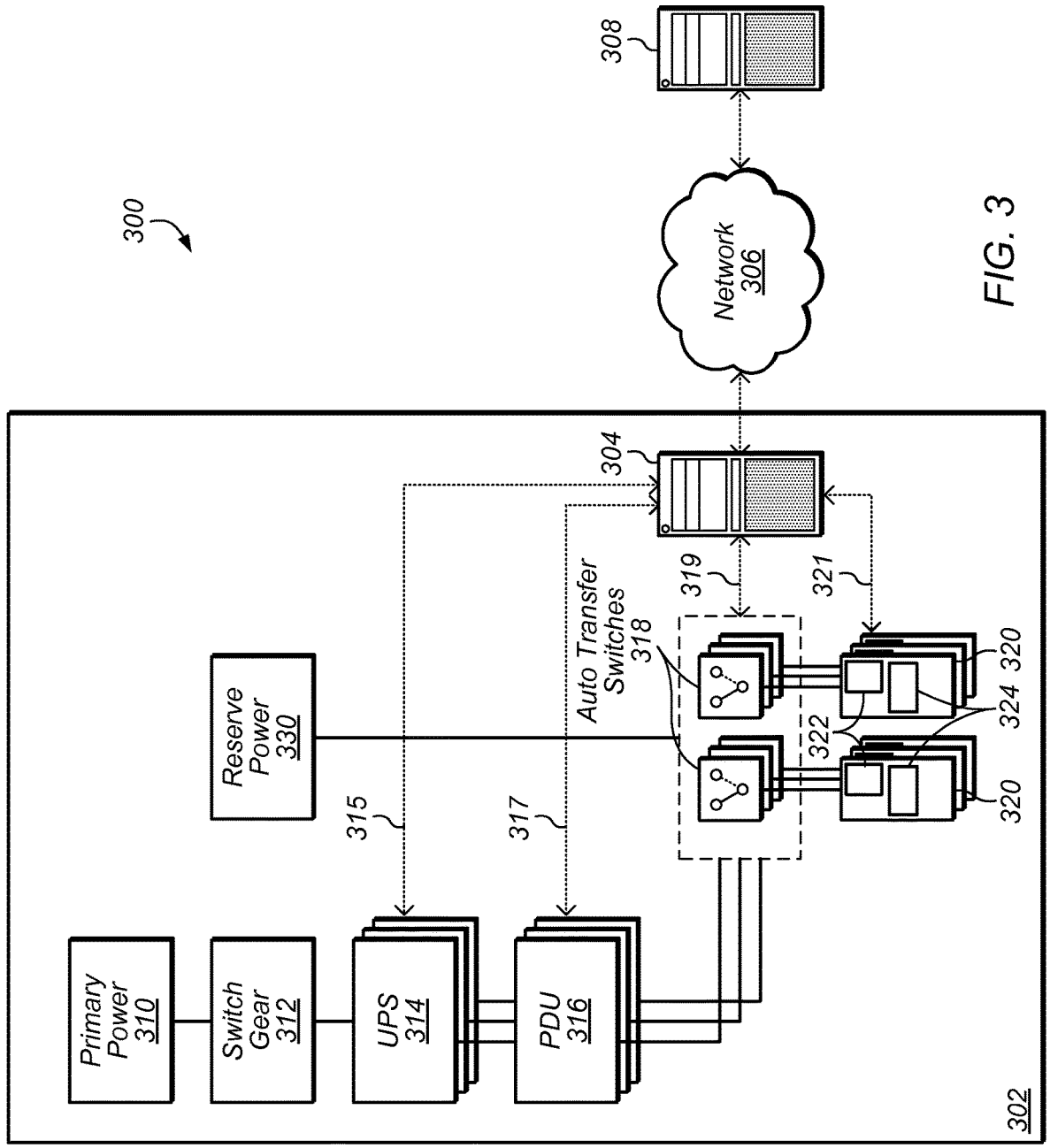
FIG. 3 illustrates one embodiment of a system that communicatively couples various data center devices to a communication network via a network gateway device.

FIG. 3 illustrates one embodiment of a system that communicatively couples various data center devices in a data center to a communication network via a network gateway device. System 300 includes data center 302, communication network 306, and remote network device management computer 308. The illustrated data center 302 includes a primary power source 310, switchgear 312, UPS bank 314, PDU bank 316, ATS devices 318, and rack computing systems ("racks") 320, which include electrical loads 324 and floor PDUs 322. The illustrated data center 302 further includes a reserve power source 330, and one or more ATS devices 318 can switch the source of power provided to one or more electrical loads 324 between the primary power source 310 and the reserve power source 330.

In some embodiments, one or more devices in the data center 302 include networking-enabled electronic devices that can be communicatively coupled to a network gateway device 304 that is itself communicatively coupled to a network 306. Such devices may thus be communicatively coupled to other devices coupled to network 306, including, in the illustrated embodiment, for example, a remote network device management computer 308. In some embodiments, one or more of the devices in data center 302 may be communicatively coupled to the network gateway device 304 through one or more pathways that may include one or more physical network cables. For example, in the illustrated embodiment, one or more of devices 314, 316, 318, 322, and 324 may be coupled to device 304 through one or more respective communication pathways 315, 317, 319, and 321, one or more of which may include a physical network cable.

PDUs 316 may be floor PDUs. In some embodiments, one or more PDUs 316 includes a transformer that transforms the voltage from switchgear 312. Each of racks 320 may include one or more rack PDUs 322. The rack PDUs 322 may distribute power to electrical loads 324.

In some embodiments, communication pathways between various devices and a network gateway device may form a local communication network, such that the various devices are networked at least with the network gateway device. For example, in the illustrated embodiment, where each device 314, 316, 318, 322, and 324 is connected to network gateway device 304 via pathways 315, 317, 319, and 321, the devices 314, 316, 318, 322, and 324 may be coupled to device 304 over a local communication network formed via pathways 315, 317, 319, and 321.

In some embodiments, communicatively coupling multiple devices in one or more locations to a network 306 via a single network gateway device 304 can enable remote monitoring and maintenance of the multiple devices without requiring a large quantity of network switch devices. In some embodiments, a network gateway device may include a finite number of network interface controller ports ("NIC ports") through which to couple to the various devices at a location, and the number of devices to be coupled to the network 306 may exceed the number of available NIC ports. Therefore, a system that enables coupling some or all of the electronic devices 314, 316, 318 at a location to a network gateway device 304 using fewer NIC ports than available on the network gateway device 304 can enable substantial cost savings in coupling the various devices to the network 306.

In some embodiments, the communication pathways may enable communication between the various devices in addition or in alternative to communication between one or more of the devices and the network gateway device.

Figure 4:
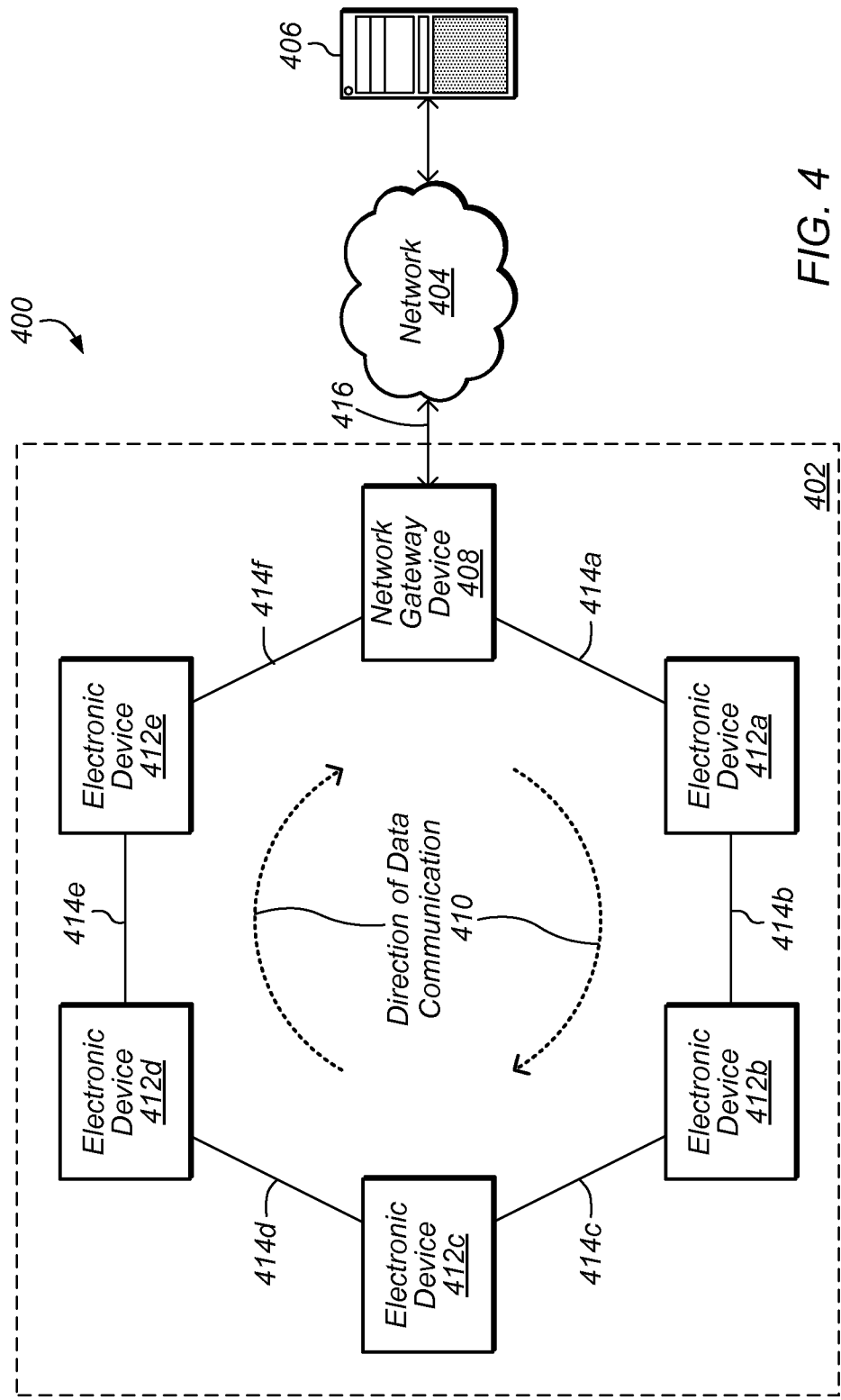
FIG. 4 illustrates one embodiment of a system including various networking-enabled electronic devices communicatively coupled in series with a network gateway device coupled to a separate communication network.

FIG. 4 illustrates one embodiment of a system including various networking-enabled electronic devices communicatively coupled in series with a network gateway device to form a local communication network, where the network gateway device is coupled to a separate communication network. System 400 includes local network 402, communication network 404, and remote network device management computer 406. In some embodiments, local network 402 comprises a LAN, network 404 comprises a WAN, and device 408 communicatively couples one or more devices in the LAN to one or more devices in the WAN.

Local network 402 includes multiple networking-enabled electronic devices 412a-e communicatively coupled to a network gateway device 408, where the network gateway device is coupled to network 404 via a communication pathway 416, so that each of the devices 412a-e is communicatively coupled to network 304. In some embodiments, one or more of the devices 412a-e may be monitored and maintained remotely by computer 406. In some embodiments, one or more of the devices 412a-e may be monitored and maintained locally by network gateway device 408. For example, network gateway device 408 may include a network controller that monitors and takes maintenance actions with regards to devices 412a-e. In such an example, device 408 may perform actions based upon communications with remote computer 406, including firmware update instructions. In another example, device 408 may provide remote computer 408 with data associated with one or more of the device 412a-e, which may include analysis of some or all of the data, action recommendations based at least in part on the analysis, etc. Such localized monitoring and maintenance of devices in network 402 by device 408 may enable at least some delegation of monitoring and maintenance authority from a central remote computer 406 to one or more local controller devices, thereby reducing bandwidth loads on pathway 416 and processing loads on computer 406.

In some embodiments, electronic devices 412a-e in local communication network 402 are coupled in series with each other to form the communication network. Such serial coupling may include serially coupling one or more devices 412 with network gateway device 408, such that the devices 412 and device 408 are communicatively coupled in series to local communication network 402. In some embodiments, such serial coupling of devices 412 and device 408 may form a communication network 402 that has a ring topology. Such a "ring network" may include a single continuous pathway of data communication through each of the devices in the network. For example, as shown in the illustrated embodiment, each device 412 and 408 in a ring network 402 is coupled to two other devices, and a unidirectional communication pathway proceeds from device to device in a single direction, as illustrated by arrows 410.

In some embodiments, each of the devices 412 and 408 in a ring network 402 are coupled to two other devices by physical network cables that connect the devices. For example, in the illustrated embodiment, each device 412a-e and 408 is connected to two other devices by two corresponding network cables 414a-f, such that the devices 412a-e and 408 are communicatively coupled by the cables 414a-f in series to form a ring network 402.

In some embodiments, coupling the various devices 412a-e in series with network gateway device 408 using cables 414a-f to form a ring network 402 enables the various devices 412a-e to be coupled to device 408 using fewer NIC ports on device 408 than the quantity of devices 412a-e. For example, as shown in the illustrated embodiment, ring network 402 includes five devices 412a-e coupled in series to device 408 with only two connections with device 408 through cables 414a and 414f. As a result, coupling devices 412a-e in series to device 408 may, in some embodiments, require no more than two NIC ports on device 408. Such a ring network coupling of the devices 412 may enable multiple electronic devices to be communicatively coupled to network 404 using a single network gateway device.

In some embodiments, coupling multiple electronic devices in a ring network with a network gateway device provides both cost benefits and power savings benefits. For example, by only requiring a single network gateway device per group of devices, the expenditure required to network even a large quantity of electronic devices at multiple locations may be significantly reduced over coupling each device to a separate gateway device, such as illustrated and discussed with reference to FIG. 2. In another example, by only adding one device per network that requires a separate power source (the network gateway device), and because the cabling used to couple the various networked devices in series may not require its own separate power supply, as the cabling, in some embodiments, is configured to passively route signals, data communications, etc., power requirements for networking the networking of electronic devices in a ring network may be significantly reduced over coupling each device to a separate gateway device.

Figure 5:
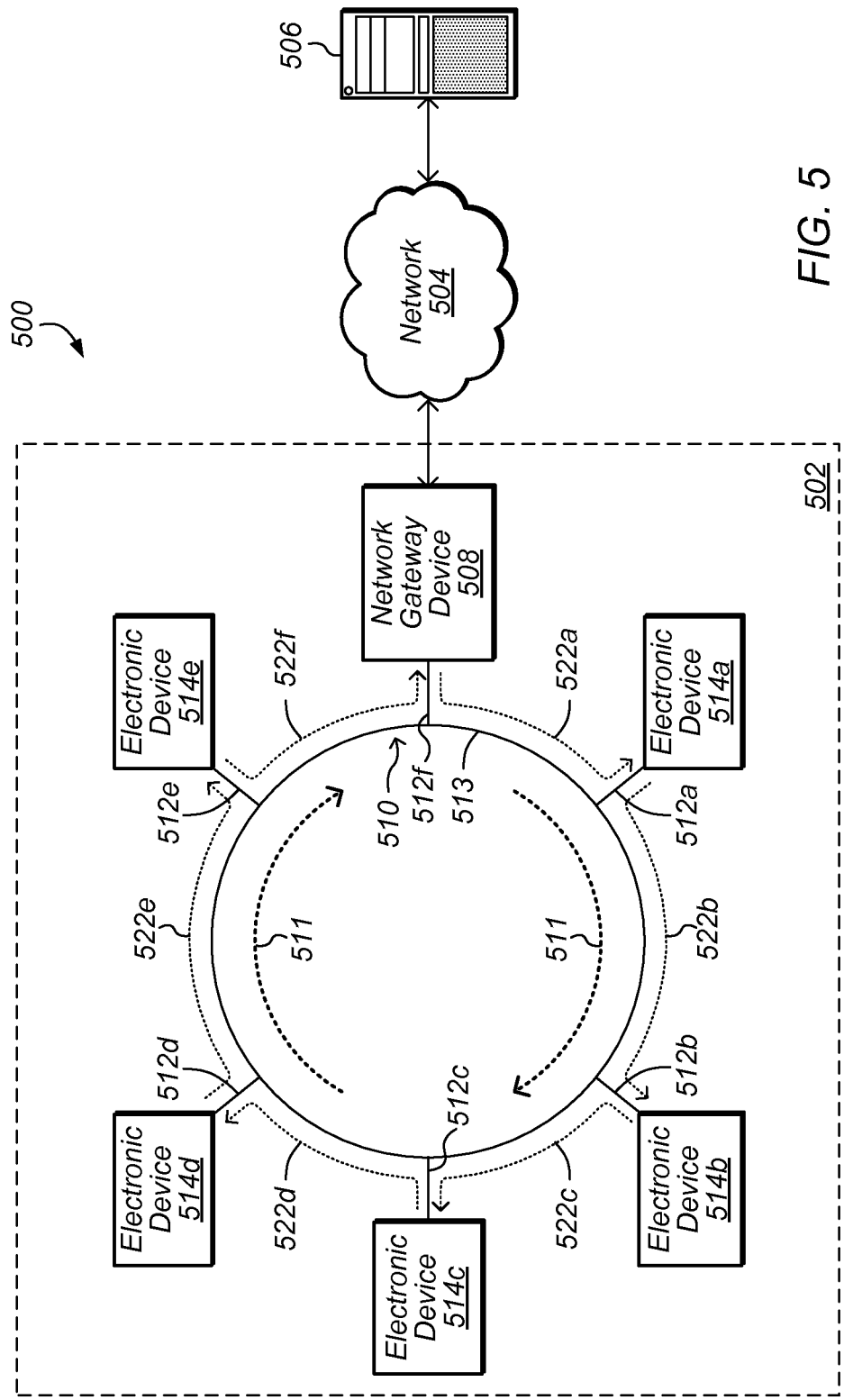
FIG. 5 illustrates one embodiment of a system including a loop cable assembly coupling various networking-enabled electronic devices in series to a communication network coupled with a network gateway device that is coupled to a separate communication network.

FIG. 5 illustrates one embodiment of a system including a loop cable assembly coupling various networking-enabled electronic devices in series to a communication network coupled with a network gateway device that is coupled to a separate communication network. System 500 includes local network 502, communication network 504, and remote network device management computer 506. In some embodiments, local network 502 comprises a LAN, network 504 comprises a WAN, and device 508 communicatively couples one or more devices in the LAN to one or more devices in the WAN.

In some embodiments, local network 502 is a ring network where multiple networking-enabled electronic devices 514a-e are coupled to a network gateway device 508 in series to form network 502, such that each device 514 is communicatively coupled to network 504 through device 508. In some embodiments, a network gateway device as described hereinafter may include one or more workstations, including a Berkeley Software Distribution ("BSD")-based workstation, an OpenBSD-based workstation, etc. As discussed above with reference to FIG. 4, some embodiments of a ring network may be formed through separately coupling each device to two other devices in series using two or more separate cables. In some embodiments, a local ring network 502 may be formed through coupling each device 514 and 508 to a loop cable assembly 510, where the loop cable assembly couples to each device using a single port, so that each device 514 and 508 is coupled in series to form a ring network 502 using a single port per device.

For example, as shown in the illustrated embodiment, loop cable assembly 510 may include a cable loop 513 and multiple cable branches 512a-f, where each branch terminates in a network cable connector that is configured to connect with a networking-enabled device. For example, where loop cable assembly 510 includes one or more Ethernet cables, each respective Ethernet cable branch may terminate in a respective RJ-45 cable plug that may be plugged into a corresponding RJ-45 cable jack of an electronic device to communicatively couple the electronic device to the ring network 502 via the loop cable assembly 510. In some embodiments, the loop cable assembly 510 includes cabling and connectors that are configured to passively route signals, data communications, etc. For example, the loop cable assembly may include cables and connectors that are hard-wired for communicating data along particular wires between one or more particular connectors, along one or more wires in a certain direction between one or more particular connectors, etc. Such cabling and connectors configured to passively route data communications may be configured to route data communications without one or more instances of circuitry that selectively controls routing of signals, data communications, etc., which may include circuitry comprised in a network switching device. For example, the loop cable assembly may include cables and connectors that are configured to route data without use of one or more processors, instances of circuitry, switches, etc. to control which pathways data is routed, select which one or more particular connectors data is routed between, etc. In the illustrated embodiment, the loop cable assembly 510 may include cabling in cable loop 513 that is hard-wired to route data communications in direction 511, cabling in branch 512a that is hard-wired to passively route data communications from device 508 to device 514a along pathway 522a, passively route data communications from device 514a to device 514b along pathway 522b, etc. without one or more processors, instances of circuitry, switches, etc. selectively controlling which one or more devices data is routed to or from, which one or more pathways along which the data communications are routed, etc.

In some embodiments, a ring network of electronic devices coupled to a loop cable assembly enables unidirectional data communication along the loop cable assembly 210, in a similar manner as described above with reference to FIG. 4. Devices in such a ring network may be coupled in series with each other, such that a given data packet may pass from device to device along the network. For example, as shown in the illustrated embodiment, data communications through ring network 502 may pass in a single direction 511 along loop cable assembly 510. As a further illustration, data communications along loop cable assembly 510 may pass 522a down through cable branch 512a to be received at device 514a and then pass 522b back up through cable branch 512a and along a portion of cable 513 to pass down through cable branch 512b to device 514b, pass 522c back up through branch 512c to cable 513, and so on, as illustrated by paths 522d-f. Such unidirectional communications may include a given data packet passing sequentially to one or more devices in ring network 502 until the data packet arrives at a particular device, which may be an intended target recipient of the data packet.

In some embodiments, each device 514 in ring network 502 is configured to analyze received packets to determine whether that device is the target recipient and selectively process or forward the packet based on the determination. Each device in a ring network may be assigned a particular network address, which may include a static Internet Protocol (IP) address. In addition or in alternative, one or more network interfaces, which may include a NIC, in a given device in the ring network may be assigned a particular Media Access Control (MAC) address. In some embodiments, one or more network addresses assigned to a device, assigned to an element associated with a device, etc. (i.e., a "local" network address), may be used to determine whether the device is a target recipient of a received communication.

For example, in the illustrated embodiment, device 514d may receive a data packet passing 522d along loop cable assembly 510 and analyze the data packet to determine whether device 514d is the target recipient. In some embodiments, a received data packet includes data that specifies a "target" network address assigned to the target recipient device. A match of the "target" network address with a network address assigned to the device, assigned to an element associated with the device, etc., may lead to a determination that the device is the target recipient of the data packet. If the device is the target recipient, device 514d may process the data packet and execute one or more programs of instructions accordingly based at least in part upon the data packet contents. If the device 514d is not the intended recipient, which may be determined based at least in part upon the "target" network address not matching any local network address, the device 514d may forward the data packet to the next destination device 514e in the ring network 502. Because a ring network may enable unidirectional travel of data packets between devices coupled in series, data packet forwarding along the ring network may include forwarding a data packet from a given device to the next (also referred to hereinafter as "subsequent") device along the direction of data communication in the ring network. The identity of a "next" device for any given device can be established, such that the given device can direct a data packet to be forwarded to a particular network address associated with the "next" device. Such a "next" network address may be stored at the given device. In an example, the given device may be configured to modify a data packet to be forwarded along the ring network to specify that the forwarding destination of the data packet is the "next" network address.

In some embodiments, a destination network address may be contrasted from a target network address, in that a destination network address may specify the next forwarding destination of the data packet in the ring network, while the target network address may specify the final intended recipient of the data packet. While, in some embodiments, such as where the target recipient is the next destination in a ring network, the destination network address and the target network address may be the same, such may not always be true. For example, in the illustrated embodiment, where device 514c receives a data packet, the data packet specifying a destination network address that matches the local network address of device 514c and a target network address that matches a local network address of device 514e, device 514c may be configured to determine that it is not the target recipient, modify the data packet to specify a destination address that matches a local network address of device 514d, and then forward the data packet to device 514d along loop cable assembly 510. In such an example, the analysis and forwarding process may be repeated at device 514d, but device 514e may determine that it is the target recipient and process some or all of the contents of the data packet, rather than simply forward the data packet to device 508.

In some embodiments, a single network gateway device can be coupled to multiple loop cable assemblies that each include multiple separate electronic devices coupled in series, so that the network gateway device is coupled to multiple ring networks. For example, where a network gateway device has multiple NIC ports, each port may be coupled to a network connector of a different loop cable assembly. In such an embodiment, multiple ring networks may share a common network gateway device.

Figure 6:
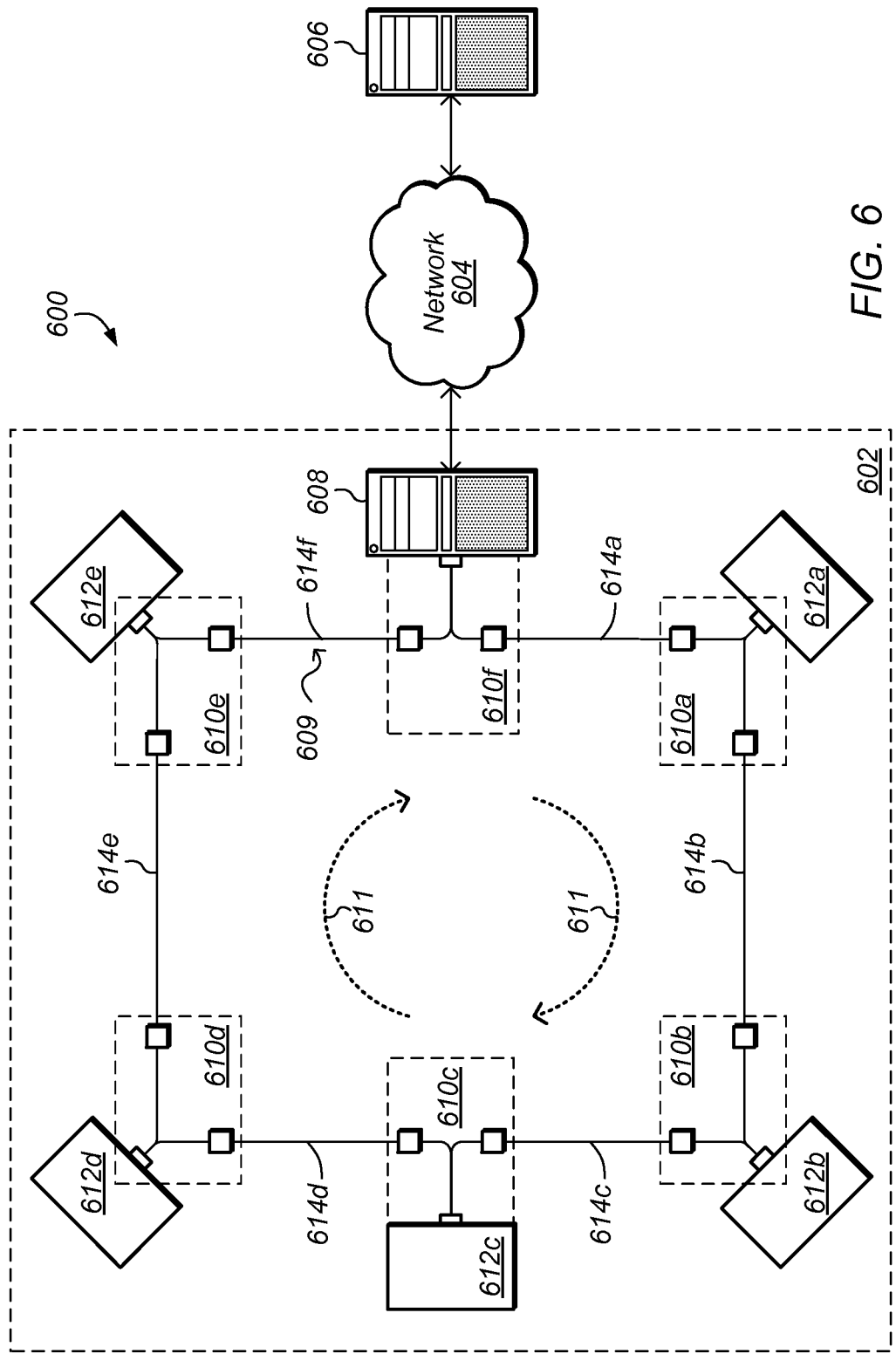
FIG. 6 illustrates one embodiment of a system including a modular loop cable assembly, comprising network dongles and cables, coupling various networking-enabled electronic devices in series to form a communication network.

FIG. 6 illustrates one embodiment of a system including a modular loop cable assembly, comprising network dongles and cables, coupling various networking-enabled electronic devices in series to form a communication network. System 600 includes local network 602, communication network 604, and remote network device management computer 606. As similarly illustrated in FIG. 4 and FIG. 5, local network 602 includes multiple networking-enabled electronic devices 612 and a network gateway device 608 coupled in series, such that local network 602 comprises a ring communication network.

In some embodiments, as discussed and illustrated above with reference to FIG. 5, a loop cable assembly that couples multiple devices in series to establish a ring network may include a single length of cable that includes branches to couple to each device in series. In some embodiments, a loop cable assembly includes a modular assembly of multiple components, including multiple separate network cables coupled to network dongles, where the network dongles couple cabling to respective devices and the network cables couple the network dongles together to form the loop cable assembly. For example, as shown in the illustrated embodiment, ring network 602 includes a loop cable assembly 609 that includes multiple network dongles 610a-f and network cables 614a-f. In the illustrated embodiment, each dongle 610 is coupled to a separate device 612, 608 and is coupled to two separate network cables 614, which themselves are each coupled to respective other dongles 610.

As described above with reference to FIG. 4 and FIG. 5, devices in a ring network may be coupled in series with each other, such that a given data packet may pass from device to device along the network. For example, as shown in the illustrated embodiment, data communications through ring network 602 may pass in a single direction 611 along loop cable assembly 609.

In some embodiments, the loop cable assembly 609 includes cabling that is configured to passively route signals. The loop cable assembly 609 may include one or more network cables 614a-f and network dongles 610a-f that are hard-wired to communicate data to and from particular connectors, in a certain direction, etc. For example, dongle 610 may include one or more connectors, pathway cables, etc. that are configured to passively route incoming data received from device 608 via network cable 614a to device 612a and to passively route data outgoing data from device 612a toward device 612b via network cable 614b. Such connectors, cables, etc. may be hard-wired to route data between selected connectors, along selected data pathway cables and wires therein, etc. without using processors, instances of circuitry, etc. to selectively control one or more connectors, data pathway cables, wires, etc. through which and between which data is routed.

In some embodiments, one or more network dongles include one or more particular network connectors configured to couple with one or more network connectors of one or more networking-enabled electronic devices, network cables, etc. For example, in the illustrated embodiment, where the ring network 602 is an Ethernet network, and each network cable 614 includes an Ethernet cable, each network dongle 610 may include an Ethernet connector to couple the dongle with an Ethernet connector of a given network cable 614. A given dongle 610 may further include an Ethernet connector to couple the dongle with an Ethernet Connector of a given device 612, 608. As a further example, each network cable 614 may include RJ-45 network plug connectors at each end of the cable 614, while one or more of the dongles 610 may include two RJ-45 network jack connectors that are configured to couple with separate RJ-45 network plug connectors of separate network cables 614. In addition, the one or more of the dongles 610 may include an RJ-45 network plug connector configured to couple with at least one of the devices 612, 608.

It will be appreciated that, in some embodiments, one or more various dongles and cables in a network 602 may include different types of network connectors. In addition, some dongles, cables, etc., may include different wiring from other dongles, cables, etc., in the network. One or more of such dongles, cables, etc., may include an adapter for coupling with dongles, cables, devices, etc., with different wiring, may be coupled to a device 612 that is an adaptor, etc. For example, while each of dongles 610a-e may be configured to include one or more RJ-45 plugs to couple with respective devices 612a-e, dongle 610f may be configured to include an RJ-48 plug to couple with device 608.

Such a communicative coupling of devices, dongles, and cables enables each device 612, 608 to be coupled in series to the other devices 612, 608 through the coupling of dongles 610 and cables 614, thereby forming ring network 602. In some embodiments, one or more of the dongles includes two sets of cabling that each extend between a network connector that can be coupled to an electronic device to separate network connectors that can be coupled to separate network cables. For example, as illustrated in FIG. 6 and further illustrated and discussed below with reference to FIG. 7, each dongle 610 may include two separate network connectors that couple to separate network cables 614 and separately extent to a single network connector that couples to one of the devices 612, 608. Where, as discussed above, the dongles 610 are part of a ring network 602 that features unidirectional communication between the various devices in the network, an "input" network cable connector in a dongle may receive data from a network cable and pass the data along an input cabling to a network connector coupled to an electronic device (i.e., a network device connector), where the data is received by at least some part of the coupled device. Data from the device, including data being forwarded over the ring network by the device, may be passed from the network device connector, along an output cabling, to an "output" network cable connector, where the data is passed along the ring network to a next device via a network cable, separate from the network cable from which the data was originally received at the dongle, coupled to the output network cable connector.

In some embodiments, a modular construction of a loop cable assembly with one or more network cables and dongles may enable the loop cable assembly to be variably sized to couple a variable quantity of devices to the ring network. In addition, the loop cable assembly may be sized to accommodate physical constraints of a location at which the devices are physically located. For example, a physical distance between some devices to be coupled to the network may be substantially greater or less than distances between some other devices to be coupled to the network. In such cases, a modular loop cable assembly can include one or more network cables of variable length between dongles to accommodate variable physical distributions of the devices to be coupled to the network. Such a modular loop cable assembly can further be modified to accommodate changes in the network, including changed quantities and physical distributions of devices coupled to the network.

Figure 7:
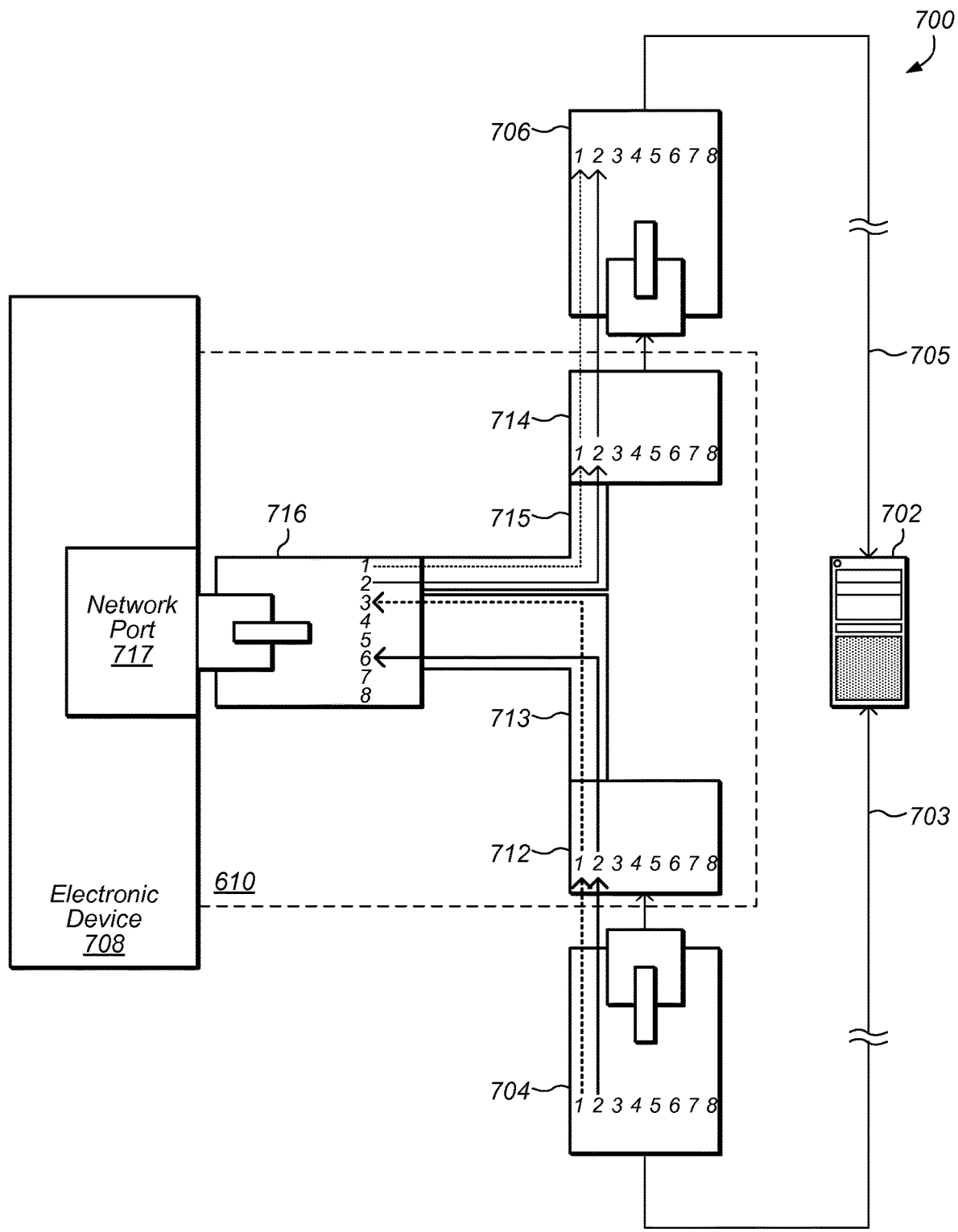
FIG. 7 illustrates one embodiment of a network dongle coupling a networking-enabled electronic device to another device in series to form a communication network.

FIG. 7 illustrates one embodiment of a network dongle 610 as illustrated above with reference to FIG. 6, where the dongle couples a networking-enabled electronic device to another device in series to form a communication network 700 having a ring topology. The network 700 includes a network gateway device 702, an input network cable 703 extending from the network gateway device 702, an output network cable 705 extending to the network gateway device, a networking-enabled electronic device 708, and a dongle 610 that communicatively couples the device 708 to device 702 in series through the network cables 703, 705 to form a ring network.

In some embodiments, a dongle includes three network connectors and two separate cables, where two of the network (cable) connectors are each configured to couple with separate network cables, the third network (device) connector is configured to couple with an electronic device, and the separate cables and separately configured to pass data between the network device connector and one of the network cable connectors, where one cable can pass data from a particular network cable connector to the network device connector, and the other cable can pass data from the network device connector to the other network cable connector. An example of a dongle is shown as element 610 in the illustrated embodiment. The illustrated dongle 610 includes an "input" network connector 712 that is configured to couple with a network connector of a network cable, including input network cable connector 704. The dongle 610 also includes an "output" network connector 714 that is configured to couple with another network connector of another network cable, including output network cable connector 706. In the illustrated embodiment, input network connector 712 is configured to receive data from network cable 703 via connector 704, and output network connector 714 is configured to send data through network cable 705 via connector 706.

As further shown in the illustrated embodiment, dongle 710 includes two separate cables 713, 715 that is configured to communicatively couple one of the respective network connectors 712, 714 to a network connector 716, which itself is configured to couple with a networking-enabled electronic device 708. Connector 716 may be configured to couple with device 708 at one or more NIC ports 717. Cable 713 may be configured to pass data received at connector 712 to connector 716, where the data is passed to device 708. In addition, cable 715 may be configured to pass data received at connector 716 from device 708 to connector 714, where the data is passed to cable 705.

In some embodiments, various components of the dongle include industry-standard connectors. For example, in the illustrated embodiment, where dongle 610 is configured to couple to Ethernet plug connectors 704, 706 of respective Ethernet network cables 703, 705 and an Ethernet NIC port 717 of device 708, connectors 712, 714 may each include at least an Ethernet "jack" connector, while connector 716 may include at least an Ethernet "plug" connector.

In some embodiments, each connector 712, 714, 716 may each include wiring pins, and the cables 713, 715 between connectors may include particular wirings configured to couple to particular pins on particular connectors. For example, in the illustrated embodiment, dongle 610 may include RJ-45 connectors; each connector may include particular pin-outs such that one or more particular wires of a particular cable are coupled from a particular pin of one connector to another particular pin of another connector.

As shown in the illustrated embodiment, a particular wiring configuration for a dongle having RJ-45 connectors may include the input "jack" connector 712 having one input cable 713 wire connecting jack connector 712 pin 1 to the "plug" connector 716 pin 3 and another, separate, input cable 713 wire connecting jack connector 712 pin 2 to plug connector 716 pin 6. As further shown in the illustrated embodiment, a particular wiring configuration for a dongle having RJ-45 connectors may include the plug connector 716 having one output cable 715 wire connecting plug connector 716 pin 1 to the "jack" connector 714 pin 1 and another, separate, output cable 715 wire connecting plug connector 716 pin 2 to jack connector 714 pin 2.

In some embodiments, at least some pin-outs for connectors coupled to a certain type of network cables may follow an industry standard for such a type of network cables. For example, where the network cables are Ethernet cables with RJ-45 connectors and are configured to pass data through wires connected to connector pins 1 and 2, both connectors 712 and 714 may be configured to respectively receive and send data from and to such network cable connectors 704, 706 via pins 1 and 2.

In some embodiments, a dongle includes one or more connectors, cabling, etc. that are each configured to passively route signals. For example, dongle 610 may include a network connector 712 that is hard-wired to receive incoming data from connector 704, network connector 716 that is hard-wired to passively route the incoming data from cable 713 to device 708 and to passively route outgoing data from device 708 to cable 715, and network connector 714 that is hard-wired to provide outgoing data from cable 713 to connector 706.

Figure 8:
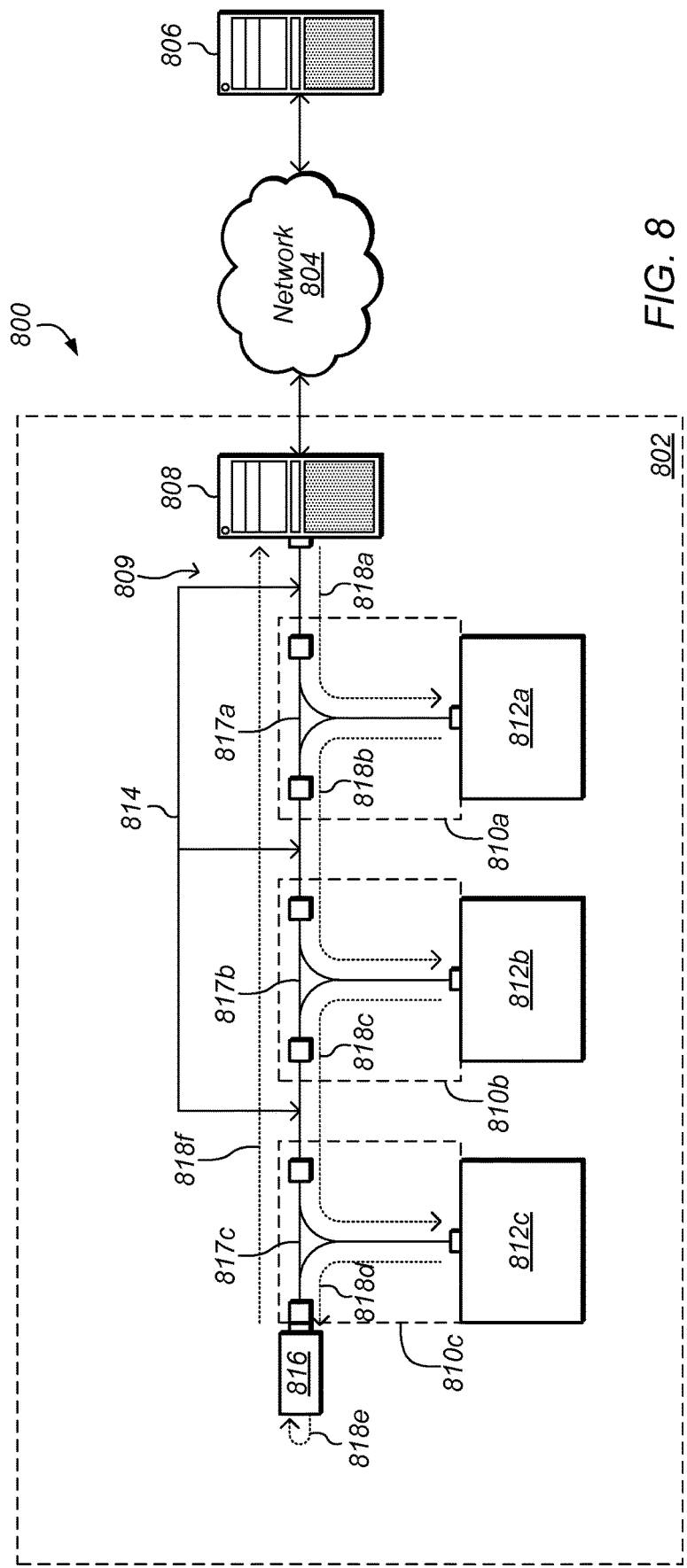
FIG. 8 illustrates one embodiment of a system including a modular loop cable assembly, comprising network dongles, cables, and a terminator, coupling various networking-enabled electronic devices in series to form a communication network.

FIG. 8 illustrates one embodiment of a system including a modular loop cable assembly, comprising network dongles, cables, and a terminator, coupling various networking-enabled electronic devices in series to form a local communication network that can be communicatively coupled to another communication network. System 800 includes a local communication network 802, where a network gateway device 808 in the network 802 is communicatively coupled to a network 804, to which various remote devices, including the illustrated network device management computer 806, may be communicatively coupled.

Referring briefly above to at least FIG. 5-6, a local network may enable multiple networking-enabled electronic devices to be communicatively coupled in series to a network gateway device that is itself coupled to a communication network, which can enable monitoring, maintenance, etc. of the various devices by one or more controller devices, management devices, etc. As illustrated in FIGS. 5-6, a loop cable assembly to which the various devices are coupled in series may enable a ring network including unidirectional communication of data through at least the loop cable assembly.

In some embodiments, a loop cable assembly to which the various devices are coupled in series may enable a ring network including unidirectional communication of data through separate wires of the loop cable assembly, such that data may pass between coupled devices through particular one or more wires of the loop cable assembly in one direction along the loop cable assembly, and further such that data may pass between at least two coupled devices through other particular one or more wires of the loop cable assembly in another direction along the loop cable assembly. Such other particular one or more wires passing in the other direction along a length of the loop cable assembly may bypass one or more various electronic devices coupled to the loop cable assembly along the same length. Such other particular one or more wires may comprise a "back-pass pathway" that enables a ring network to be implemented using at least a linear cable assembly that is coupled to a network gateway device at one end and a network terminator device at another end, rather than a ring-shaped cable assembly that is coupled to the network gateway device at both ends and passes data through wires in the assembly in a single direction along the length of the assembly.

For example, in the illustrated embodiment, local network 802 includes a network with a ring topology, where the devices 812a-c are communicatively coupled in series with a network gateway device 808. Data communications may pass unidirectionally between individual devices coupled to the network, as shown by data pathways 818a-c. In the illustrated embodiment, the loop cable assembly 809 to which the devices 812, 808 are coupled in series, and which itself comprises network dongles 810a-c and network cables 814, is coupled at one end to device 808 and is coupled at another end to a network terminator device.

The illustrated loop cable assembly is configured to enable data communications to pass in two directions, in at least two separate wires, along the length of the loop cable assembly. For example, at least one set of wires in the network cables 814 and dongles 810 are communicatively coupled in series enable unidirectional communication of data, along one or more sequential pathways 818a-d, from the device 808, and between successive devices 812 along the length of the loop cable assembly. Another set of wires 817a-c in the network cables 814 and dongles 810 are communicatively coupled in series to form the above-described back-pass pathway that enables unidirectional communication of data towards device 808 along one or more sequential pathways 818f.

In some embodiments, data passing along one set of wires in one direction along a loop cable assembly can be routed into a back-pass pathway in another direction along the loop cable assembly by a network terminator device. Such a terminator device may be configured to connect one or more "output" ends of the first set of wires to one or more "input" ends of the back-pass pathway, and enables a ring network to be formed with a loop cable assembly where. For example, in the illustrated embodiment, loop cable assembly is capped at one end of its length by a network terminator device 816 that reroutes data 818e from one set of wires that communicate data in one direction along the length of the loop cable assembly to another set of wires that communicate data in another direction along the length of the loop cable assembly. In some embodiments, a network terminator device is configured to couple with a network connector of one or more of a network cable, network dongle, etc. For example, in the illustrated embodiment, network terminator device 816 is coupled to a network connector of network dongle 810c, particularly an "output" network connector that is configured at least to receive data from device 812c. In the illustrated embodiment, each dongle 810 includes, in addition to the network connectors and input and output cables described above with reference to FIG. 6-7, another back-pass pathway cable 817 that couples each of the network connectors of the dongles that are configured to couple to network cable connectors. In particular, each pack-pass pathway cable 817 may be configured to couple a given output network connector of a given network dongle 810 to an input network connector of the same network dongle 810, such that data communicated through the back-pass pathway is communicated from the output connector to the input connector. In such an embodiment, data passing through the back-pass pathway cable may be communicated towards a network gateway device 808 in a direction that bypasses one or more of the electronic devices 812a-c coupled to the loop cable assembly 809.

Figure 9A:
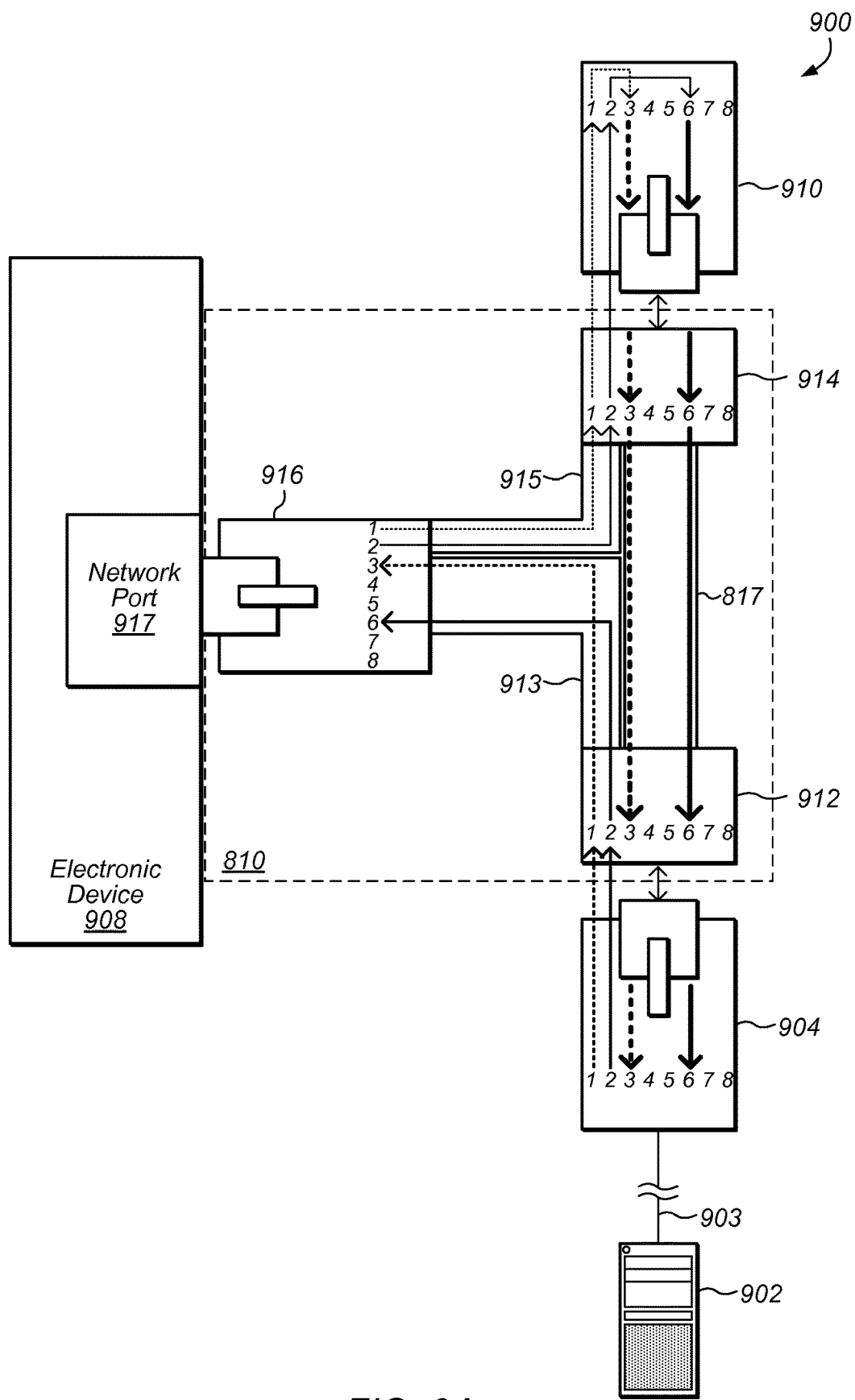
FIG. 9A illustrates one embodiment of a network dongle with a back-pass pathway coupling a networking-enabled electronic device to another device in series with a terminator to form a communication network.

FIG. 9A illustrates one embodiment of a network dongle 810 with a back-pass pathway 817 coupling a networking-enabled electronic device to another device in series with a terminator device 910 to form a communication network having a ring topology.

Similarly to the network described and illustrated above with reference to the network 700 in FIG. 7, the network 900 includes a network gateway device 902, an input network cable 903 extending from the controller device, a networking-enabled electronic device 908, and a dongle 810 that communicatively couples the device 908, at network port 917, to device 902 in series through the network cable 903 to form a ring network. In addition to the network 700, network 900 includes a terminator device 910 coupled to an "output" network connector 914 of dongle 810 and is configured to reroute data received via particular one or more pins of that connector 914 to another one or more pins of that same connector 914, where the other pins are connected, via a back-pass pathway cable 919, back to an "input" network connector 912 which is itself coupled to a network cable 903, via connector 904, and is configured to communicate data received at connector 912 over the back-pass pathway 817 back to device 702 via one or more wires in the cable 903.

In some embodiments, each connector 912, 914, 916 may each include wiring pins, and the cables 913, 915, and 817 between connectors may include particular wirings configured to couple to particular pins on particular connectors. For example, in the illustrated embodiment, dongle 810 may include RJ-45 connectors, and each connector may include particular pin-outs such that one or more particular wires of a particular cable are coupled from a particular pin of one connector to another particular pin of another connector.

As shown in the illustrated embodiment, a particular wiring configuration for a dongle having RJ-45 connectors may include the input "jack" connector 912 having one input cable 913 wire connecting jack connector 912 pin 1 to the "plug" connector 916 pin 3 and another, separate, input cable 913 wire connecting jack connector 912 pin 2 to plug connector 916 pin 6. As further shown in the illustrated embodiment, a particular wiring configuration for a dongle having RJ-45 connectors may include the plug connector 916 having one output cable 915 wire connecting plug connector 916 pin 1 to the "jack" connector 914 pin 1 and another, separate, output cable 915 wire connecting plug connector 916 pin 2 to jack connector 914 pin 2.

As also shown in the illustrated embodiment, a particular wiring configuration for a dongle having RJ-45 connectors and a back-pass pathway cable 817 may include the jack connector 914 having a back-pass pathway cable 817 wire connecting jack connector 914 pin 3 to jack connector 912 pin 3 and another, separate back-pass pathway cable 817 wire connecting jack connector 914 pin 6 to jack connector 912 pin 6. In addition, as also shown, terminator device 910 may be configured to connect pin 1 to pin 3, and pin 2 to pin 6, of the same terminator device 910, so that data received at pin 1 of the device 910 from connector 914 is rerouted back to pin 3 of the connector 914, while data received at pin 2 of the device 910 from connector 914 is rerouted back to pin 6 of the connector 914.

In some embodiments, at least some pin-outs for connectors coupled to a certain type of network cables may follow an industry standard for such a type of network cables. For example, where the network cables are Ethernet cables with RJ-45 connectors and are configured to pass data through wires connected to connector pins 1 and 2, and both connectors 912 and 914 may be configured to respectively receive and send data from and to network cable connector 904, and terminator device 910, via pins 1 and 2, terminator device 910 may include an RJ-45 plug connector configured to couple to an RJ-45 jack connector 914.

Figure 9B:
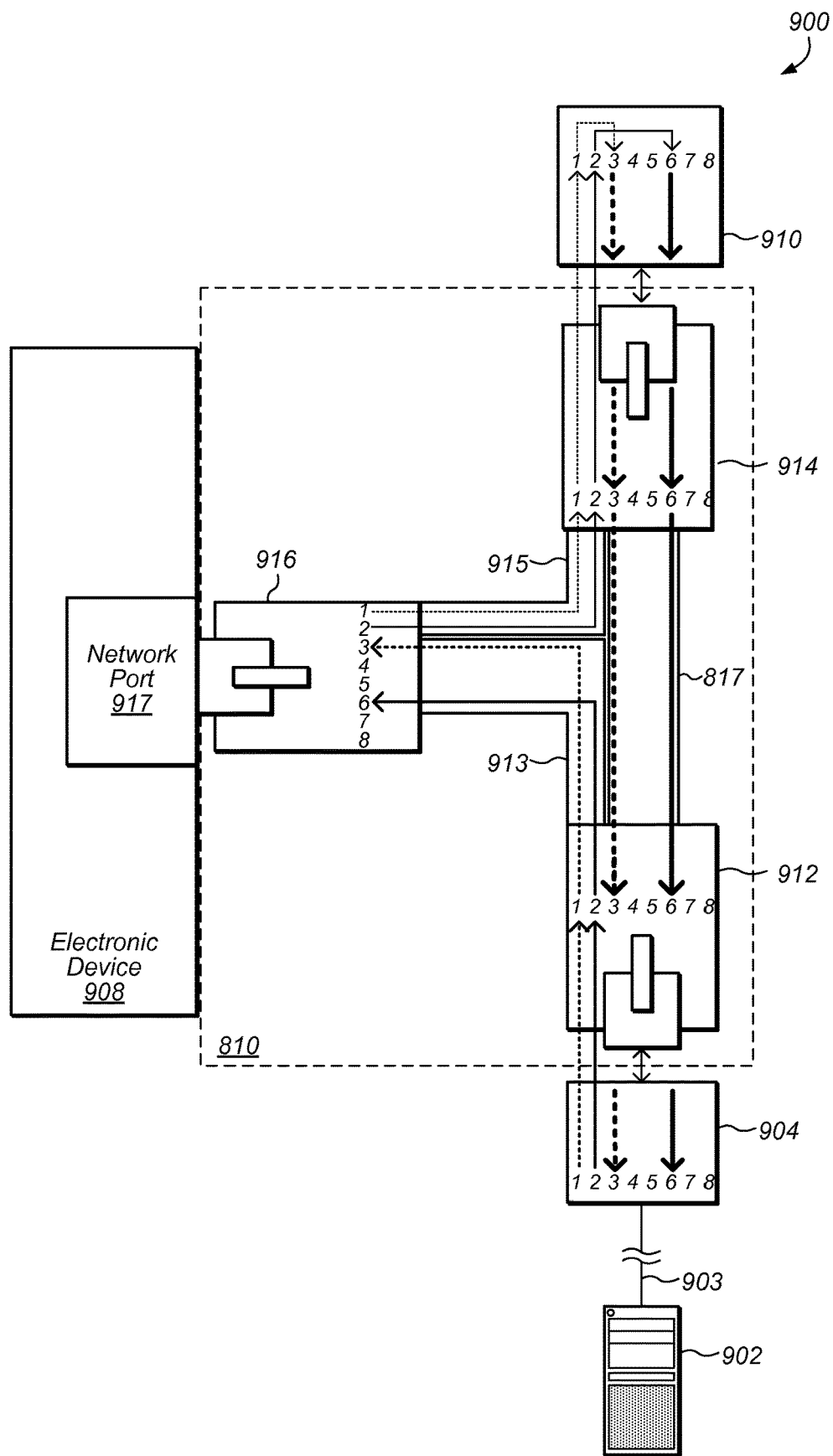
FIG. 9B illustrates one embodiment of a network dongle with a back-pass pathway coupling a networking-enabled electronic device to another device in series with a terminator to form a communication network.

FIG. 9B illustrates one embodiment of a network dongle 810 with a back-pass pathway 817 coupling a networking-enabled electronic device to another device in series with a terminator device 910 to form a communication network having a ring topology.

In some embodiments, a network dongle 810 may include one or more various configurations of network connectors. For example, as shown in the illustrated embodiment of FIG. 9B, a network dongle 810 may include network connectors that are all "plug" connectors. As shown, network connectors 912, 914, and 916 each include a "plug" network connector. The plug network connectors 912 and 914 each couple with respective "jack" network connectors 904, 910. As shown in the illustrated embodiment, a network terminator device 910 may include a "jack" network connector that can couple with a plug network connector 914. In some embodiments, the network dongle 810 includes various other combinations of network connectors. For example, network connectors 912, 914, and 916 may each include a "jack" network connector.

FIG. 10, FIG. 11, FIG. 12 and FIG. 13 are tables illustrating one embodiment of pinouts on various network interfaces of a network dongle and terminator device. As illustrated and discussed above with reference to FIG. 8-9, some embodiments of a ring network may include one or more dongles and cables configured to include network connections, where the dongles further include a back-pass pathway cable, and a network terminator device configured to reroute data from one data pathway in one direction to another data pathway in another direction.

In some embodiments, network connections included in a dongle may follow an industry standard for network connections. For example, in the illustrated embodiments of FIG. 10-13, each connector of at least one network dongle and network terminator, such as illustrated in FIG. 9B, include RJ-45 network connections having pin-outs configured to communicate data between devices coupled in series in a ring communication network.

Figure 14:
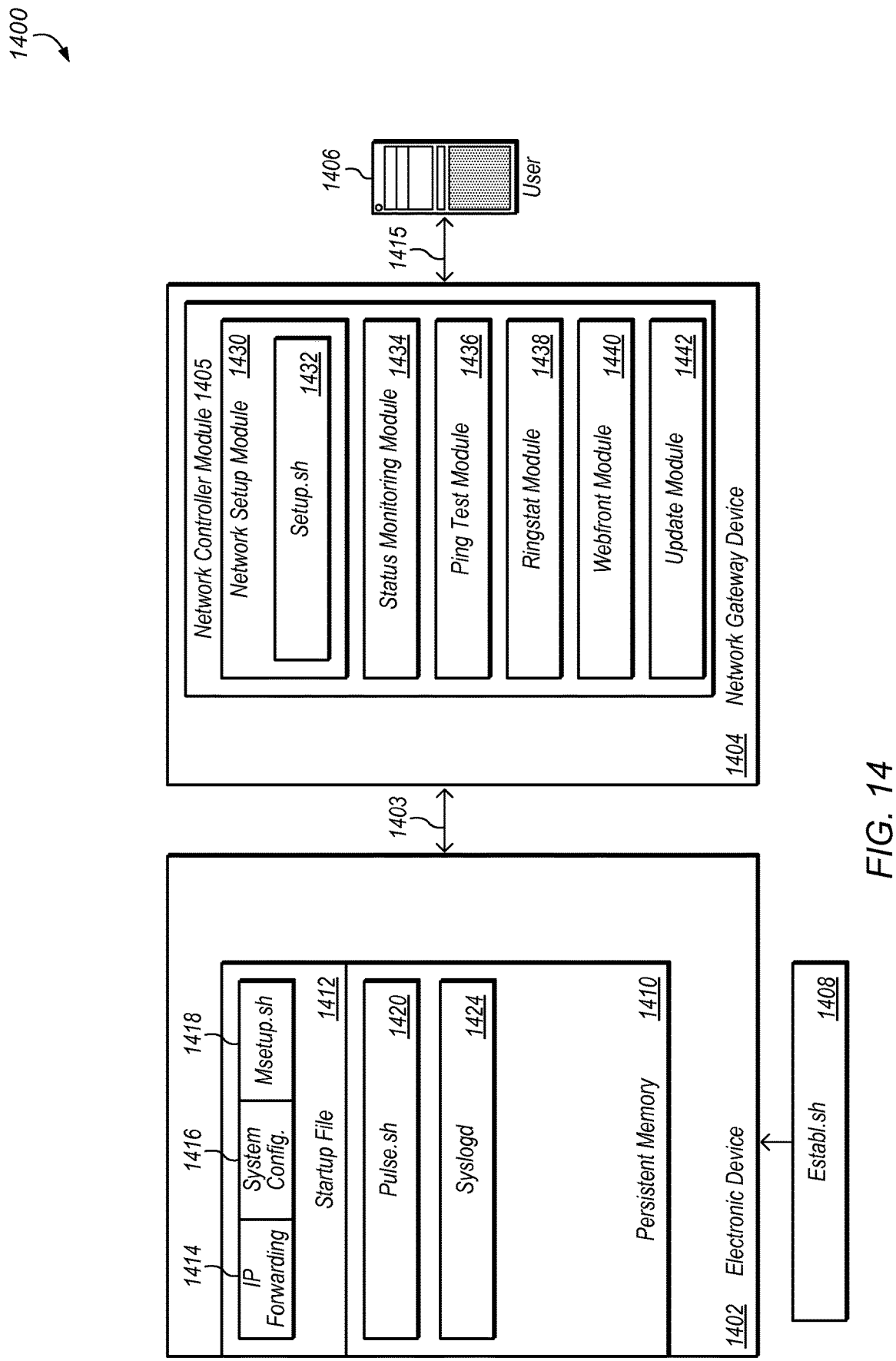
FIG. 14 illustrates one embodiment of a system including a networking-enabled electronic device and controller device including respective modules to implement networked communication, monitoring, and maintenance of the networking-enabled electronic device by the controller device.

FIG. 14 illustrates one embodiment of a system 1400 including a networking-enabled electronic device and controller device including respective modules to implement networked communication, monitoring, and maintenance of the electronic device by the controller device. The system 1400 includes a networking-enabled electronic device 1402 that is communicatively coupled to a network gateway device 1404 through a local communication network 1403. The device 1404 is itself communicatively coupled to a remote communication network 1415, to which other devices, including the illustrated network device management computer 1406, may be communicatively coupled.

In some embodiments, as discussed and illustrated above, various networking-enabled electronic devices may be coupled to one or more network gateway devices via a communication network having a ring topology, enabling the electronic devices to be monitored and maintained by a network device management computer via a remote network. As further discussed, variable levels of control, monitoring, and maintenance authority regarding devices in a local network can be distributed to one or more devices in the network, including the network gateway device itself.

In some embodiments, an electronic device to be coupled to a ring local network is not initially configured for communication with devices in a ring network. Programs of instruction can be loaded on a given device to configure it for various operations and communications in a ring network, which may include network 1403. Such programs of instruction may be loaded on a device prior to physically coupling the device to the network, so that the device is already prepared for ring network communications and operations upon connection. For example, in the illustrated embodiment, a program script 1408, illustrated here as "establ.sh", may be loaded onto device 1402. Such loading may occur prior to coupling device 1402 to network 1403. Device 1402 may be coupled to network 1403 via one or more various means, including a network connector of a loop cable assembly as discussed and illustrated with reference to the above figures. In some embodiments, one or more elements of device 1402 are implemented by some or all components of one or more computer systems, as discussed and illustrated further below.

In some embodiments, the program of instructions 1408 is loaded to a persistent memory 1410 of device 1402. It will be appreciated that persistent memory is interpreted to refer to a memory that can store information, even when not powered, and can recover such information, even after being un-powered for a period of time. Such a persistent memory may also be referred to, in some embodiments, as non-volatile memory.

Upon loading to the persistent memory 1410, program 1408 may be executed by at least some part of device 1402, including one or more processors, to perform particular functions that prepare the device 1402 for communication and operations in a ring communication network. For example, program 1408 may be executed to configure a startup file 1412 (also referred to as startup script) of the device 1402, located in persistent memory 1410, in various ways to enable ring network communication and device monitoring. In some embodiments, program 1408 is executed to establish the startup file 1412. The established startup file 1412 may overwrite another startup file 1412 on device 1402. In some embodiments, program 1408 is executed to modify a startup file 1412 in device 1402. The startup file 1412 may be modified to enable Network Forwarding 1414 by the device 1402 over network 1403. In some embodiments, such as in the illustrated embodiment, network forwarding may include IP Forwarding. Such modification may include inserting particular script into startup file 1412 that, when executed, enable IP Forwarding by device 1402. IP Forwarding, in some embodiments, includes a process executed by some part of the device 1402, including one or more processors, to utilize network routing information, including one or more destination network addresses, to determine whether to forward a data packet to one or more of the network addresses over one or more networks. Such an IP Forwarding process can enable the device 1402 to forward data packets communicated between devices coupled in series in a ring network, so that each device will forward the data packet to its targeted recipient device.

In some embodiments, program 1408 is executable by device 1402 to monitor device startup file 1412 for "unauthorized" changes to the file, (which may include changes not made by execution of program 1408) and prevent such unauthorized changes from being implemented. Thus, program 1408, once loaded into a device 1402 persistent memory 1410, can enable certain "authorized" (including changes made by execution of program 1408) to persist in the startup file 1412 after device reboots, firmware upgrades, etc.

Another modification to the startup file 1412 that may be caused by execution of program 1408 may include creating a custom syslog configuration file 1416. A syslog file may be used to log various parameters associated with device 1402, including system messages associated with some or all functions of device 1402. A further modification to the startup file 1412 that may be caused by execution of program 1408 may include modifying the startup file to execute a program of instructions 1418 that establishes one or more monitoring and communication programs in a portion of the memory of device 1402. Such a program of instructions, as illustrated in FIG. 14, may hereinafter be referred to as "Msetup.sh" program, and modifying startup file 1412 to cause device 1402 to execute the Msetup.sh program when the startup file 1412 is used.

In some embodiments, the Msetup.sh program 1418, when executed, may establish various monitoring and communication programs in one or more portions of a memory of device 1402, including persistent memory 1410. For example, the program 1418, when executed, may monitor one or more monitoring programs and establish such programs if those programs are determined to be not running In some embodiments, one of those programs is a "heartbeat" program 1420, referred to hereinafter as pulse.sh, which generates a signal that is to be transmitted over a ring network to a controller device 1404 to indicate that the device 1402 is communicatively coupled with the ring network. In such an embodiment, receipt of a "heartbeat" signal from device 1402 may be processed and interpreted by some part of device 1404 as an indication that device 1402 is communicatively coupled over network 1403. In some embodiments, pulse.sh 1420 is initially loaded into persistent memory 1420 of device 1402 based at least in part on execution of the preparation program 1408, and can be executed by the Msetup.sh program 1418. In some embodiments, another program that may be executed by the Msetup.sh program 1418 includes a syslogd program 1424 which logs various system messages associated with some or all of device 1402. For example, where device 1402 includes an ATS device, syslogd 1424 may log various system messages associated with parameters of the ATS device, including operating conditions of the device, health of the device, power load at the device, etc. Such program 1424 may establish one or more logs of data, including one or more logged system messages, and may further generate a data packet for transmission over network 1403 to device 1404, where the data packet includes at least some of such data. Such a data packet may be generated in response to one or more various triggers, which may include an elapse of a predetermined period of time, in response to receipt at device 1402 of a certain command over network 1403, including a command to transmit log data, etc.

In some embodiments, by loading the various programs into a persistent memory of device 1402, including executing a program of instructions 1408 to modify a startup file 1412 of the device 1402 that is located in a persistent memory 1410, the device may be configured, in addition to communicate in a ring network and to perform one or more programs, to also establish such programs and communication capabilities even after a reboot of device 1402, which may include a loss and re-establishment of power to device 1402. As a result, program 1408 may not be required to be re-loaded onto device 1402 to prepare it for ring network communication and operations, and device 1402 is configured, via the startup file 1412, to prepare the device 1402 after every reboot.

In some embodiments, configuring a device 1402 for ring network communication and operations includes configuring the device 1402 to recognize its own network addresses, as well as one or more network addresses assigned to one or more other devices coupled to the network. For example, a device 1402 may be assigned a static IP address, which may identify the device 1402 within the ring network 1403. A MAC address associated with device 1402, including a MAC address assigned to an NIC port included in the device 1402, may be noted. Such assignment and noting may be performed by some part of a network controller 1405, which may, in some embodiments, be at least partially included in a network gateway device 1404, a remote device 1406 remotely coupled to the ring network via another communication network, some combination thereof, etc. In the illustrated embodiment, for example, various program modules, which may be implemented at least in part by one or more components of one or more computer systems, that may represent at least part of a network controller 1405, are included in a network gateway device 1404, such that the device 1404 performs various monitoring and maintenance functions with regard to one or more devices 1402 coupled to device 1404 via network 1403.

In some embodiments, the device 1402 may be configured for communications over ring network 1403 by providing the device 1402 with data indicating the device's 1402 own ("local") one or more network addresses, including a local IP address, and a "next destination", or "next-hop" network address, including an IP address, associated with the "next destination" or "next-hop" device in the ring network 1403. In some embodiments, the IP addresses for some or all devices in network 1403 are assigned by some part of the controller. The IP addresses may be static. In some embodiments, the IP addresses of one or more devices are dynamically assigned by the controller.

In some embodiments, one or more devices 1402 coupled to network 1403 are provided with the relevant local and "next-hop" network addresses via a data packet transmitted to the respective devices 1402 from a controller via network 1403. Such a data packet may include a User Datagram Protocol ("UDP") data packet, referred to herein as a "Network Setup Packet", "setup packet", etc. The setup packet may include a program of instructions, referred to herein as "setup.sh", which, when executed by a recipient device 1402, causes the device to associate a network address specified in the setup packet as the device's 1402 local network address and to associate another network address specified in the setup packet as the "next-hop" network address for the device 1402. In some embodiments, the program of instructions may be referred to as "missile.sh". Upon execution of the setup.sh program, a given device 1402 may be able to implement IP Forwarding in network 1403 to selectively process or forward, to the next-hop device, data communications received at some part of the device 1402, including an NIC port of the device 1402.

In some embodiments, a network controller includes a network setup module 1430 that is configured to generate an individual network setup data packet for each device 1402 coupled to the network 1403. The network setup module 1430 may adapt a stored generic setup.sh script 1432 for each setup packet, based at least in part upon the assigned one or more network addresses for the device 1402 to which the setup packet is to be sent, and the assigned one or more network addresses for the device 1402 that is to be the "next-hop" device for the device 1402 to which the setup packet is to be sent. Network setup module 1430 may, upon generating setup packets for each device 1402 coupled to network 1403, transmit the data packets to each device over network 1403. In some embodiments, setup packets are transmitted sequentially, which may include transmitting the packets one by one over a predetermined time interval. In some embodiments, setup packets are transmitted in a particular order corresponding to the physical location of each given device 1402 in the ring network 1403. For example, a first setup packet may be sent to the "next" device 1402 over from the device 1404 in which the network controller 1405 is located, the next setup packet may be sent to the "next" device 1402 over from the first device 1402, and so on.

In some embodiments, each setup.sh program includes instructions that, when executed by a given device 1402, cause that device to, upon identifying the relevant local and "next-hop" network addresses, generate and send a data communication back to the network controller 1405 through network 1403, where the data communication indicates that the device 1402 is communicatively coupled to the network 1403 and has executed the setup.sh program. In some embodiments, such a data communication includes, at least in part, a "heartbeat" signal generated and sent as part of execution of the pulse.sh program 1420 by the device 1402. Upon receipt of such a data communication, the network controller 1405 may determine that the setup.sh program has been successfully received and executed by the device 1402, such that the device 1402 is configured to receive and selectively process or forward data communications over the ring network 1403.

In some embodiments, one or more of a given device's 1402 local network address and next-hop network address may be updated. For example, where one or more devices are coupled or decoupled from network 1403 after a given device 1402 is already configured for communication based at least in part on the setup.sh program, network controller 1405 may assign one or more of a new local network address and new next-hop network address for the given device 1402, and a new setup data packet may be generated and transmitted to the device 1402 to reconfigure the device accordingly.

In some embodiments, network controller 1405 includes a Status monitoring module 1434 that is configured to monitor one or more parameters associated with one or more devices 1402 coupled to the network controller 1405 via ring network 1403. Such monitoring may include receiving on one or more data communications from one or more such devices 1402, at predetermined intervals, in response to a data request sent by the network controller 1405, in response to a local trigger event on one or more devices 1402, etc., where received data communications may include data associated with one or more parameters associated with the one or more devices 1402. Such parameters may include device health information, such that the status monitoring module 1434 may be configured to process the received data to determine the health status of one or more devices 1402 based on such received data. In some embodiments, the received data may include one or more data packets received via a Simple Network Management Protocol.

In some embodiments, received data may indicate that a given device 1402 is communicatively coupled to network 1403. For example, where a received data communication is a "heartbeat" signal from a certain device 1402, status monitoring module 1434 may respond to receipt of such signal by identifying the relevant certain device and logging that the device 1402 is currently communicatively coupled to the network 1403. Where such a heartbeat signal is not received from the device 1402 after a certain period of time, in response to a query signal generated by status monitoring module, etc., status monitoring module 1434 may determine that the device 1402 is no longer communicatively coupled to network 1403.

In some embodiments, status monitoring module 1434 is configured to process received data associated with one or more devices 1402 and provide such data to one or more remote devices 1406 via another network 1415. Such data may be provided on elapse of a predetermined time interval, in response to a request for such data by device 1406, etc.

In some embodiments, network controller 1405 includes a Ping Test module 1436. Ping test module 1436 may be configured to determine whether data packets are being communicated properly through a ring network 1403 to various devices 1402 coupled thereto. Ping test module 1436 may generate one or more ping data packets that are transmitted through network 1403. In some embodiments, a ping packet is simply configured to be passed from device 1402 to device 1402 until the packet is received back at the network controller 1435, where the packet may be modified at each "hop" to include data associated with the device 1402 that forwarded the packet. In some embodiments, separate packets are sent to one or more devices 1402, where the packet includes instructions for a receiving device 1402 to generate and send an acknowledgement signal back to the network controller 1405. Where acknowledgements are received from the one or more devices 1402, the ping test module may determine that the ring network 1403 is communicating data normally. Where data, or lack thereof, is received at network controller 1405, ping test module 1435 may determine an abnormality in data communication through the ring network 1403. Such an abnormality may include an indication that one or more devices 1402 have become communicatively decoupled from the network 1403, that a problem exists with some part of a loop cable assembly through which the devices 1402 are coupled, etc.

In some embodiments, network controller 1405 includes a Ringstat module 1438 that is configured to respond to a determination that an abnormality exists in the ring network 1403. Such abnormalities may be determined by one or more of status monitoring module 1434, ping test module 1436, etc. For example, status monitoring module 1434, upon determining that a particular device 1402 has failed to send regular heartbeat signals, may call the Ringstat module to respond to the failure. Ringstat module 1438 may respond to the failure by identifying the particular device 1402 as having dropped from the ring network 1403 and may instruct the network setup module 1430 to assign one or more new next-hop network addresses to one or more remaining devices 1402 and instruct those devices to reconfigure their local forwarding capabilities accordingly.

In another example, the ping test module 1435 may be configured to, upon determining that some abnormality has arisen in the ring network 1403, including a determination that data packets are not being communicated fully through network 1403, call Ringstat module 1438 to identify the source of the abnormality. Where an abnormality in data communication through the network 1403 is caused by a device 1402 having failed, Ringstat module 1438 may be configured to identify one or more devices 1402 most likely to have failed. Ringstat module 1438 may be able to narrow down the likely failed devices 1402 to one or more candidate devices 1402. In response to identifying the candidate failed devices 1402, Ringstat module 1438 may send a message to one or more remote computers supporting one or more operators instructing the operators to take a certain maintenance action to resolve the abnormality, instruct the network setup module 1430 to reconfigure one or more devices 1402 to update next-hop network addresses to forward data to other devices on the network 1403, etc. For example, the Ringstat module 1438 may send a message to device 1406 that identifies the candidate devices 1402 and instructs the operator to check the identified devices for failure and perform maintenance if necessary to resolve the failure, which may include replacing a failed device. In some embodiments, network setup module 1430 may reconfigure the one or more devices 1402 using a program of instructions that is separate from the setup.sh program of instructions; such a separate program of instructions may be referred to as "sniper.sh", and may be distinguished, in some embodiments, from the "setup.sh" program in that "sniper.sh" may be executable to configure next-hop addresses for particular one or more devices 1402 in a network 1403 in response to a failure of another particular one or more devices 1402, while "setup.sh" may be executable to configure next-hop addresses for all devices 1402 in a network 1403.

In some embodiments, network controller 1405 includes a Webfront module 1440 that is configured to launch a non-interactive (i.e., read-only) network display interface, including a read-only webpage, that provides data associated with one or more devices 1402 coupled to the network 1403. Such an interface may be provided to a remote device 1406 supporting a remote user, and may be provided by webfront module 1440 in response to a request received over network 1415 from the device 1406. The data provided by the module may be pulled from data received and stored by status monitoring module 1434. In some embodiments, webfront module 1440 may request and receive data from each device 1402 and update the provided interface with such data.

In some embodiments, webfront module 1440 may be executed by one or more devices 1402 themselves, in response to a request received from one or more of the network controller 1405 and a remote device 1406. In one example, a webfront module 1440 executed by a device 1402 may respond to receiving such a request by transmitting data including a non-interactive interface to the requesting device through network 1403.

In some embodiments, network controller 1405 includes an updater module 1442 that is configured to implement at least some updates of one or more devices 1402 coupled to network 1403. Such updates may include firmware updates that at least partially update firmware on one or more such devices 1402. Such updates may be implemented in response to elapse of a predetermined time interval, in response to receipt of update content at the network controller, in response to receipt of an update request from a remote device 1406, in response to detection of at least some part of one or more devices 1402, including device firmware, as out of date, corrupted, etc.

Figure 15:
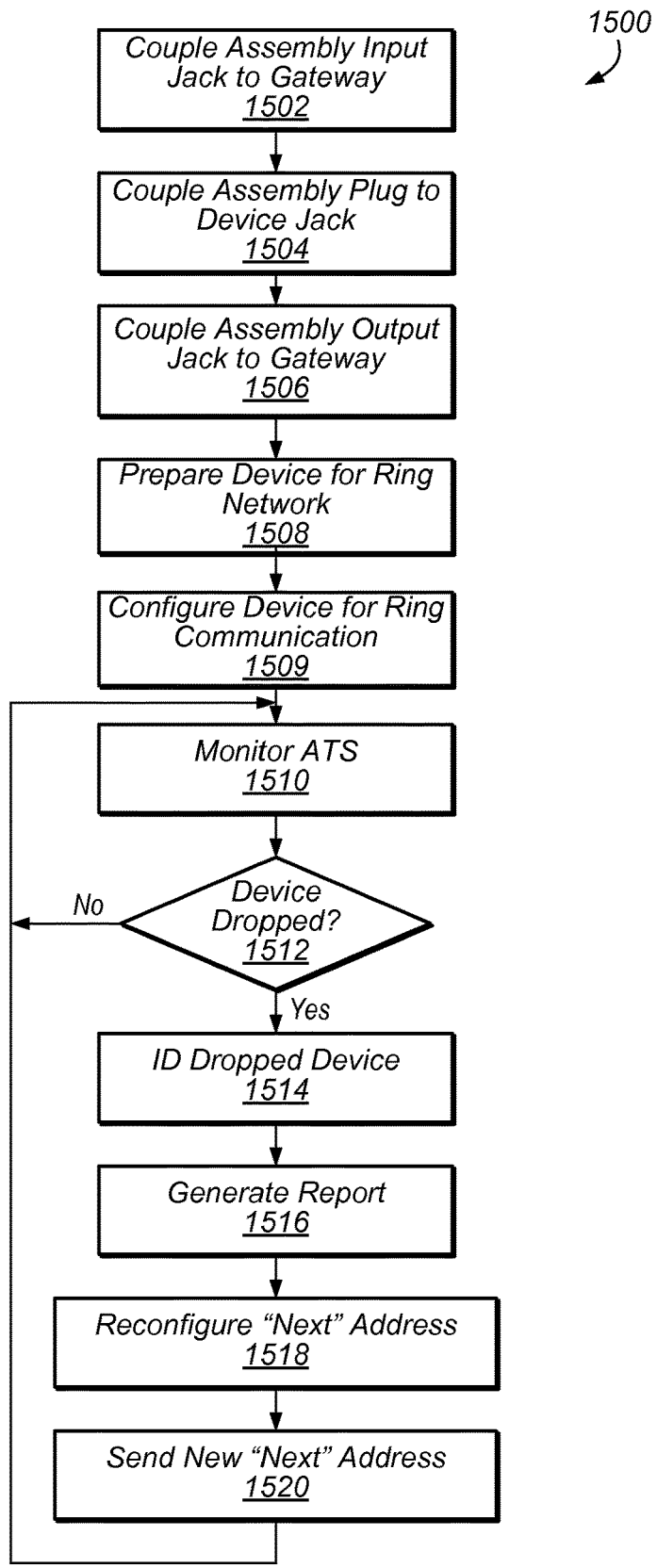
FIG. 15 illustrates one embodiment of operation of a communication network including a networking-enabled electronic device and a controller device including coupling the network components, configuring the electronic device for serial network communication and monitoring, and monitoring the electronic device by the controller device.

FIG. 15 illustrates one embodiment of operation 1500 of a communication network including a networking-enabled electronic device and a controller device including coupling the network components, configuring the electronic device for serial network communication and monitoring, and monitoring the electronic device by the controller device.

At 1502, one or more network connectors associated with a loop cable assembly are coupled to a network gateway device, so that the network gateway device is communicatively coupled to provide data to at least a part of the loop cable assembly. For example, where a loop cable assembly includes one or more network dongles having device plug connectors, coupling a network gateway device to a loop cable assembly may comprise communicatively coupling a device plug connector of one dongle to a NIC port of the network gateway device, coupling other network connectors of the dongle to one or more network cable connectors, etc. In some embodiments, the coupling may comprise coupling one network cable connector of a network cable to a NIC port of the network gateway device and coupling another network cable connector of the same network cable to a network cable "input" connector of a network dongle, so that the dongle is configured to receive data from the network gateway device.

At 1504, one or more network connectors associated with a loop cable assembly are coupled to one or more networking-enabled electronic devices, so that the electronic devices are communicatively coupled to at least a part of the loop cable assembly. Such electronic devices may include one or more ATS devices. For example, where a loop cable assembly includes one or more network dongles having device plug connectors, coupling an electronic device to a loop cable assembly may comprise coupling a device plug connector of one dongle to a NIC port of the electronic device, coupling other network connectors of the dongle to one or more network cable connectors, etc. In some embodiments, coupling one or more electronic devices to one or more network connectors associated with the loop cable assembly may couple the one or more electronic devices in series with one or more electronic devices to form a communication network of devices having a ring topology (a "ring network"). In some embodiments, coupling the one or more electronic devices to the loop cable assembly may couple the electronic devices in series with the network gateway device. For example, in the above example, where the network gateway device is communicatively coupled to a network cable input connector of a network dongle via a network cable, coupling an electronic device with a dongle plug connector may couple the device in series with the network gateway device, so that the network dongle is configured to pass data received from the network gateway device at the network cable input connector to the electronic device via one or more cables included in the dongle.

At 1506, one or more network connectors associated with a loop cable assembly are communicatively coupled to the network gateway device, so that the network gateway device is communicatively coupled to receive data from at least a part of the loop cable assembly. Continuing the above example, where an electronic device is coupled to a plug connector of a network dongle, and the input connector of the network dongle is communicatively coupled to the network gateway device via a network cable, the communicative coupled to the network gateway device may include coupling an output connector of the network dongle to another network cable, where the network cable is coupled to an NIC port of the network gateway device, so that the dongle is configured to pass data from the electronic device to the network gateway device through the output connector.

In some embodiments, the network gateway device can be coupled to send and receive data over the loop cable assembly via a single NIC port. For example, where the network gateway device is coupled to a plug connector of a network dongle at an NIC port of the network gateway device, the network dongle may be communicatively coupled in series with other electronic devices over the loop cable assembly based at least in part on coupling an output connector of the network dongle to a network cable that is itself coupled to another dongle, and coupling an input connector of the network dongle to another network cable that is itself coupled to another dongle, as illustrated above with reference to FIG. 6.

In another example, such as illustrated above with reference to FIG. 8, a terminator may be coupled to an output connector of a dongle that includes a back-pass pathway cable, so that data forwarded in one direction along a length of a loop cable assembly extending from a network gateway device is routed back towards the network gateway devices along a back-pass pathway.

Upon coupling of the various electronic devices and network gateway device to the loop cable assembly in series, where the network gateway device is coupled to send and receive data over the loop cable assembly, the electronic devices and network gateway device may be coupled in series to form a communication network having a ring topology (a "ring network").

At 1508, one or more individual electronic devices coupled to the loop cable assembly may be prepared for communication over a ring network. In some embodiments, various electronic devices may have a default communication protocol that is incompatible with communication over a network having a ring topology. As discussed above with reference to FIG. 14, preparing a given electronic device may include loading a program of instructions to a persistent memory of the device, where the program may be executed by some part of the device to modify one or more startup files of the device and establish one or more communication and monitoring programs on the device.

In some embodiments, each device to be coupled in the ring network may be prepared prior to being physically coupled to the loop cable assembly. In some embodiments, the preparation may occur afterwards. The program of instructions may be manually loaded into each device, remotely transmitted to each device from another remote device, etc. Where the program is transmitted from another remote device, the program may be transmitted from the remote device to multiple such electronic devices simultaneously and via a different network than the ring network.

At 1509, one or more devices coupled to the ring network are configured for communication over the ring network. For example, preparation of each device at 1508 may have included enabling IP Forwarding by the device, and configuring the devices at 1509 may include instructing each device to configure its IP Forwarding to forward communications to a particular separate IP address and to acknowledge a particular local IP address assigned to itself. Such configuration may be implemented by sending one or more configuration data packets to the various devices over the ring network. Each data packet may specify a local network address for the particular device and a particular "next-hop" network address for that device. Each device, upon receiving and processing the data packet, may transmit an acknowledgment back to the network controller, which may be at least partially located in the network gateway device.

At 1510, the operation of the various electronic devices coupled to the ring network is monitored. Such monitoring may occur locally on each device, remotely on a network controller, network device management computer, some combination thereof, or the like. Monitoring may include transmission of various signals from each device coupled to the network to a network controller, network device management computer, etc., where a signal may include data regarding one or more parameters associated with the device. The data may be processed to determine the state of the device, including health, power load, presence on the network, etc.

At 1512, a determination is made whether one or more particular electronic devices have dropped from the ring network. Such a determination can be made based at least in part upon a failure to receive one or more signals from one or more devices, a determination that data communication through the network is proceeding abnormally, has been interrupted, etc. If no drop is determined, monitoring continues. If a drop is determined to have occurred, at 1514, one or more electronic devices that are determined to have been the dropped device are identified, and a report for one or more operators to address the drop is generated and sent at 1516. In addition, at 1518 and 1520, the "next-hop" network address for one or more electronic devices may be changed to enable restored communication through the ring network. In some embodiments, one or more of blocks 1509-1520 may be implemented by one or more network controllers, modules therein, etc., which may be located at one or more devices, including the network gateway device, a remote network device management computer, etc.

Figure 16:
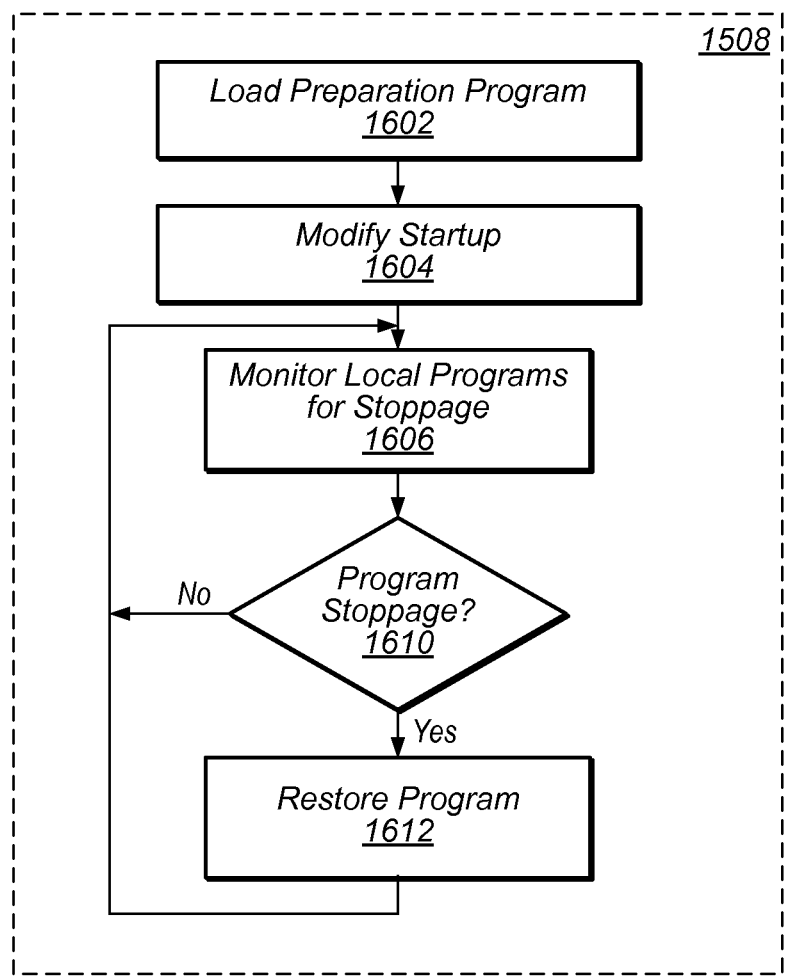
FIG. 16 illustrates one embodiment of preparing a networking-enabled electronic device for serial network communication and monitoring.

FIG. 16 illustrates one embodiment of preparing a networking-enabled electronic device for serial network communication and monitoring, as illustrated above at block 1508 in FIG. 15. 1508, in some embodiments, is performed at one or more of the electronic devices coupled in series in a ring network. At 1602, a preparation program is loaded, at the electronic device, into a persistent memory of the device.

As discussed above, the program may be provided manually to the device by an operator, remotely via transmission from another device, etc.

At 1604, the preparation program is executed on the electronic device to modify a startup file of the electronic device. Such modification can include enabling network forwarding, including IP Forwarding, by the electronic device, creating a syslog configuration file to configure a logging program, and inserting an establishing program that, when executed, executes one or more device monitoring and communication programs and monitors for any stopping of such programs. In addition, execution of the preparation program can include loading one or more of the above-described monitoring and communication programs in the persistent memory of the device.

At 1606, the establishing program is executed to cause the device to monitor for any stopping of the monitoring and communication programs. Such stopping may occur for various reasons, including a re-boot of the device. If, as shown at 1610 and 1612, a stoppage of one or more of the programs is detected, the establishing program 1612 is executed to cause the device to restore the affected programs. Because the establishing program is inserted into the startup file, the establishing program is executed upon startup of the device to restore the monitoring and communication programs.

Figure 17:
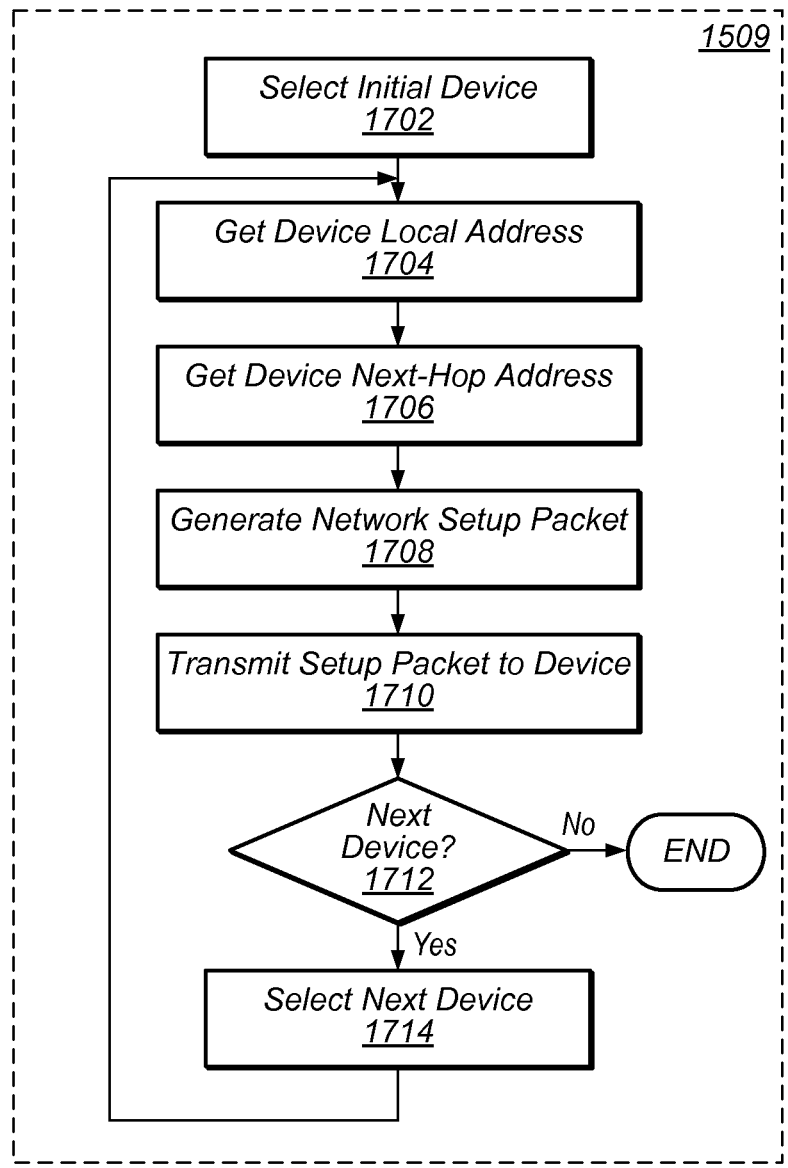
FIG. 17 illustrates one embodiment of configuring each of one or more networking-enabled electronic devices for IP Forwarding to other devices in a serial communication network.

FIG. 17 illustrates one embodiment of configuring each of one or more networking-enabled electronic devices for IP Forwarding to other devices in a serial communication network, as illustrated above at block 1509 in FIG. 15. 1509, in some embodiments, is performed at one or more network controllers communicatively coupled to one or more electronic devices in the ring network, which may be included in one or more of the network gateway device, remote network device management computer, etc. For example, 1509 may be implemented by the network setup module described above with reference to FIG. 14.

At 1702, an initial electronic device coupled to the ring network is selected. In some embodiments, a directory of electronic devices is received from a remote source, based at least in part on a ping operation over the network, etc. In some embodiments, the initial device is the "next" electronic device coupled in series with the network gateway device in the ring network, such that any communication passing from the network gateway device in a unidirectional pathway over the ring network would pass first to the initial device. A MAC address associated with the device may be acquired. At 1704, a static local network address, which may include a static IP address, is assigned to the selected device. At 1706, a next-hop network address, which may include a next-hop IP address, is assigned to the selected device. The next-hop network address may be associated with a "subsequent" electronic device that is the next device coupled to the selected device in series on the ring network, such that a data communication passing in a unidirectional pathway from the selected device to the next device on the ring network would pass to the subsequent electronic device.

At 1708, a data packet including the local and "next-hop" network addresses assigned to the selected device is generated. Such a data packet, also referred to herein as a "network setup" data packet, "setup packet", etc., includes a program of instructions that, when executed by the selected device, causes the device to configure the network forwarding capability of the device to forward data communications to the "next-hop" network address and to recognize the local network address as its own network address. At 1710, the setup packet is transmitted to the selected device over the ring network.

At 1712 and 1714, if additional devices are coupled to the ring network, the next device is selected and 1704-1710 is repeated for that device. If not, the process ends. In some embodiments, the packet for each device coupled to the network is held until some or all of the setup packets for the devices are generated, and which point all generated packets are transmitted. In some embodiments, including as illustrated, each setup packet may be transmitted upon generation without waiting for additional setup packets to be generated for other devices.

Figure 18:
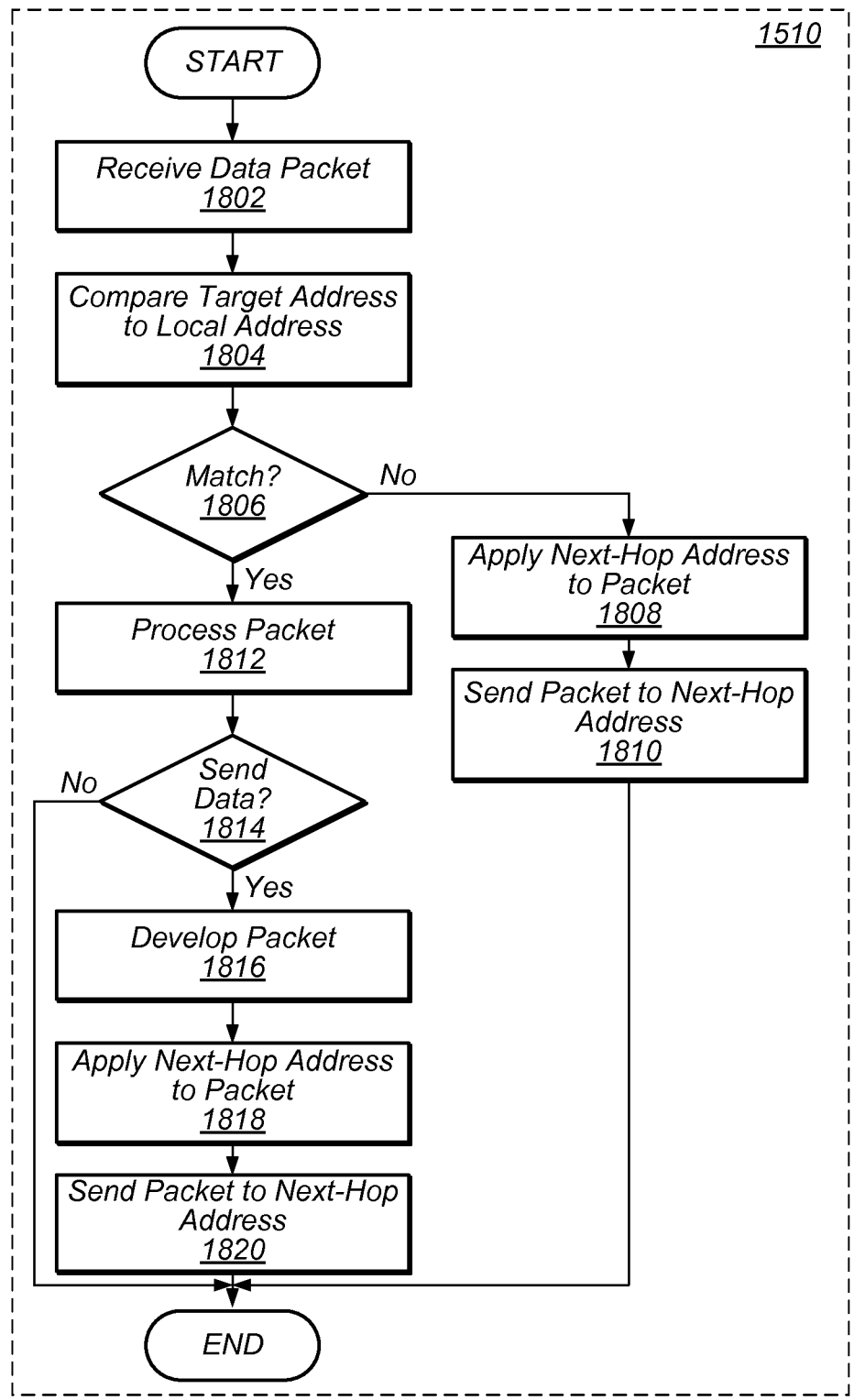
FIG. 18 illustrates one embodiment of implementing IP Forwarding to selectively forward various data communications received at a networking-enabled electronic device over a communication network.

FIG. 18 illustrates one embodiment of implementing network forwarding, which may include IP Forwarding, to selectively forward various data communications received at a networking-enabled electronic device over a communication network as illustrated above at block 1510 in FIG. 15. Such forwarding may use local and "next-hop" network addresses previously received and applied by the electronic device.

At 1802, a data packet is received at a network interface of the electronic device. The network interface may include an NIC. In some embodiments, the data packet includes data identifying the device as the "destination" of the packet over the network and other data identifying a target recipient of the data packet, where the target recipient is identified by a target network address associated with the target recipient. At 1804 and 1806, the target network address is compared against the local network address to determine whether the device is the target recipient. If, at 1808 and 1810, the network addresses do not match, the "next-hop" network address for the device is applied to the data packet to forward the data packet along the ring network to the electronic device to which the next-hop network address is assigned as its respective local network address.

If, at 1812, the network addresses do match, then the device is the target recipient, and the data packet is processed to recover the content included in the data packet. In some embodiments, the data packet includes a program of instructions that, when executed, cause the device to implement various functions. If, as shown at 1814 and 1816, the program of instructions includes an instruction to send certain data to the network gateway device over the ring network, a data packet including the requested data is generated, and a network address associated with the network gateway device is assigned as the target network address of the data packet. At 1818, the "next-hop" network address is applied to the data packet to send the data packet to the along the ring network to the electronic device to which the next-hop network address is assigned as its respective local network address. At 1820, the data packet is sent to the next-hop network address. Upon receipt of the data packet, the next-hop device may implement some or all of 1610 to selectively process or forward the data packet.

Figure 19:
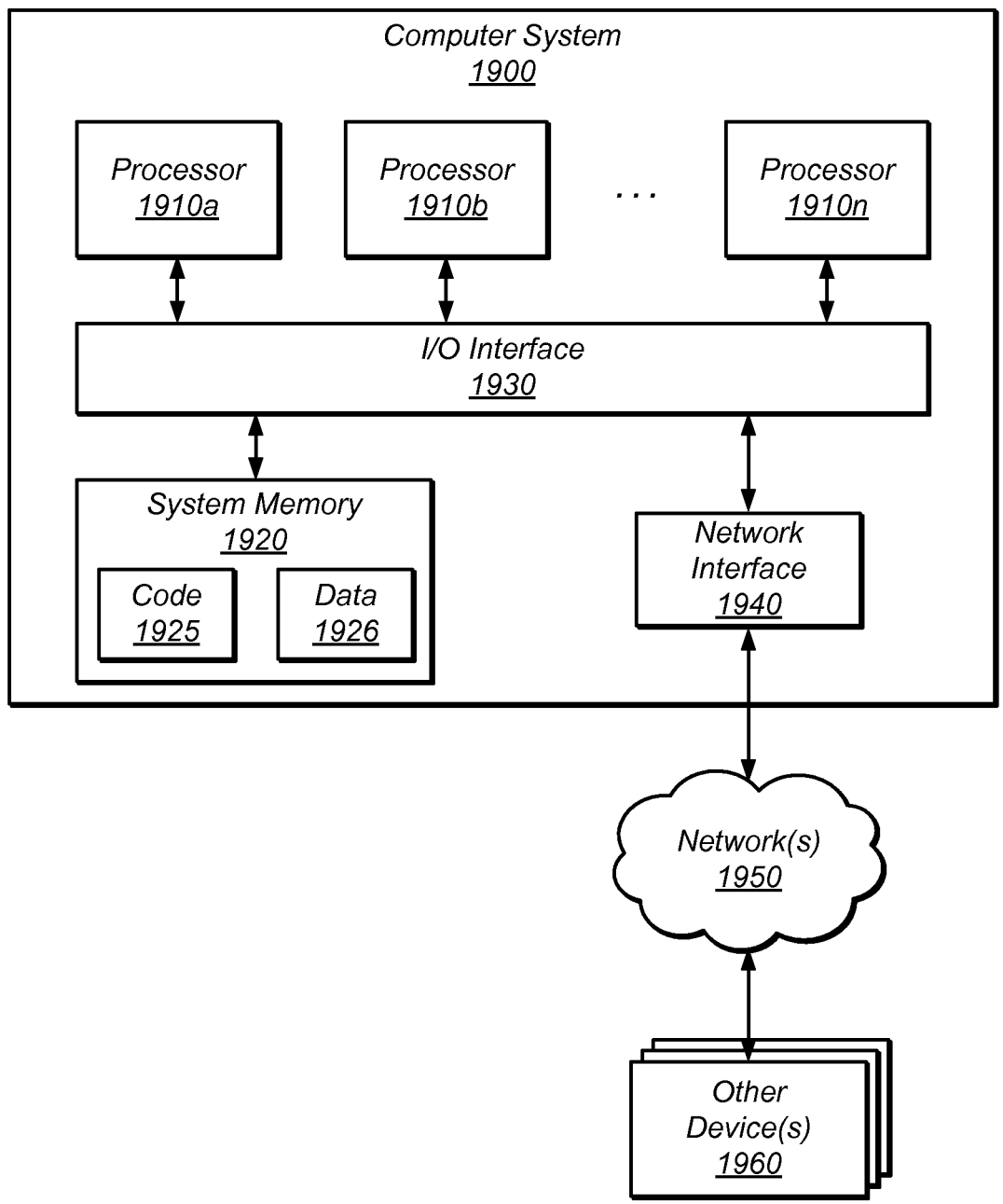
FIG. 19 is a block diagram illustrating an example computer system that may be used in some embodiments.

FIG. 19 is a block diagram illustrating an example computer system that may be used in some embodiments.

In some embodiments, a system that implements a portion or all of one or more of the technologies, including but not limited to a portion or all of one or more of the networking-enabled electronic devices, such as an ATS device, a network gateway device, a network controller device, one or more modules included therein, and various network management methods, systems, devices, and apparatuses as described herein, may include a general-purpose computer system that includes or is configured to access one or more computer-accessible media, such as computer system 1900 illustrated in FIG. 19. In the illustrated embodiment, computer system 1900 includes one or more processors 1910 coupled to a system memory 1920 via an input/output (I/O) interface 1930. Computer system 1900 further includes a network interface 1940 coupled to I/O interface 1930.

In various embodiments, computer system 1900 may be a uniprocessor system including one processor 1910, or a multiprocessor system including several processors 1910 (e.g., two, four, eight, or another suitable number). Processors 1910 may be any suitable processors capable of executing instructions. For example, in various embodiments, processors 1910 may be general-purpose or embedded processors implementing any of a variety of instruction set architectures (ISAs), such as the x86, PowerPC, SPARC, or MIPS ISAs, or any other suitable ISA. In multiprocessor systems, each of processors 1910 may commonly, but not necessarily, implement the same ISA.

System memory 1920 may be configured to store instructions and data accessible by processor(s) 1910. In various embodiments, system memory 1920 may be implemented using any suitable memory technology, such as static random access memory (SRAM), synchronous dynamic RAM (SDRAM), nonvolatile/Flash-type memory, or any other type of memory. In some embodiments, system memory 1920 includes a persistent memory. In the illustrated embodiment, program instructions and data implementing one or more desired functions, such as a portion or all of one or more of the networking-enabled electronic devices, such as an ATS device, a network gateway device, a network controller device, one or more modules included therein, and various network management methods, systems, devices, and apparatuses as described herein, are shown stored within system memory 1920 as code 1925 and data 1926.

In one embodiment, I/O interface 1930 may be configured to coordinate I/O traffic between processor 1910, system memory 1920, and any peripheral devices in the device, including network interface 1940 or other peripheral interfaces. In some embodiments, I/O interface 1930 may perform any necessary protocol, timing or other data transformations to convert data signals from one component (e.g., system memory 1920) into a format suitable for use by another component (e.g., processor 1910). In some embodiments, I/O interface 1930 may include support for devices attached through various types of peripheral buses, such as a variant of the Peripheral Component Interconnect (PCI) bus standard or the Universal Serial Bus (USB) standard, for example. In some embodiments, the function of I/O interface 1930 may be split into two or more separate components, such as a north bridge and a south bridge, for example. Also, in some embodiments some or all of the functionality of I/O interface 1930, such as an interface to system memory 1920, may be incorporated directly into processor 1910.

Network interface 1940 may be configured to allow data to be exchanged between computer system 1900 and other devices 1960 attached to a network or networks 1950, such as other computer systems or devices as illustrated in FIGS. 1 through 18, for example. Network interface 1940 may include an NIC, NIC port, etc. In various embodiments, network interface 1940 may support communication via any suitable wired or wireless general data networks, such as types of Ethernet network, for example. Additionally, network interface 1940 may support communication via telecommunications/telephony networks such as analog voice networks or digital fiber communications networks, via storage area networks such as Fibre Channel SANs, or via any other suitable type of network and/or protocol.

In some embodiments, system memory 1920 may be one embodiment of a non-transitory computer-accessible medium configured to store program instructions and data for implementing embodiments of network device configuration, monitoring, maintenance, and the like, as described above relative to FIG. 1-18. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1900 via I/O interface 1930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1900 as system memory 1920 or another type of memory. Further, a computer-accessible medium may include transmission media or signals such as electrical, electromagnetic, or digital signals, conveyed via a communication medium such as a network and/or a wireless link, such as may be implemented via network interface 1940.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of configuring each of a plurality of automatic transfer switch (ATS) devices to communicate data over a communication network having a ring topology, wherein each of the ATS devices are coupled in series with each other via the communication network, the method comprising:

performing, by at least one computing device:
assigning a separate static Internet Protocol (IP) address and a respective next-hop IP address to each ATS device, wherein the static IP addresses indicate respective ATS devices, and the next-hop IP addresses indicate respective IP forwarding addresses, of the plurality of ATS devices within the communication network; and loading, into a persistent memory of each ATS device, at least one program of instructions executable by the ATS device to:
configure at least one startup file located in persistent memory of the ATS device to, upon re-boot of the ATS device, enable the ATS device to perform IP forwarding via the ring topology, such that the ATS device is configured to forward received data packets to the next-hop IP address assigned to the ATS device, wherein the next-hop address is associated with another device coupled to the ATS device in series via the communication network, and configure the at least one startup file to, upon re-boot of the ATS device, enable the ATS device to log system messages at the ATS device and implement transmission of at least one signal based at least in part upon the logged system messages to a network gateway device over the communication network, or monitor the at least one startup file upon re-boot of the ATS device, for unauthorized changes to the at least one startup file, and prevent an unauthorized change from being implemented, wherein, in response to execution of the program of instructions by each ATS device, each ATS device is configured to restore IP forwarding, and at least one of logging system messages and transmission of the at least one signal based at least in part upon the logged system messages, or monitoring the at least one startup file for unauthorized changes, in response to a re-boot of the ATS device.

2. The method of claim 1, wherein the at least one program of instructions is executable by each ATS device to:
configure at least one startup file located in persistent memory of the ATS device to, upon re-boot of the ATS device, implement at least one self-monitoring process that monitors at least one parameter of the ATS device,
wherein the at least one signal comprises a data packet that includes data that is collected by the at least one self-monitoring process.

3. The method of claim 2, comprising performing, by at least one computing device:
monitoring each of the plurality of ATS devices via the communication network, wherein monitoring each ATS device comprises:
in response to receiving the data packet over the communication network, determining that the data packet is associated with a particular ATS device communicatively coupled to the communication network based at least in part on a particular local IP address assigned to the particular ATS device; and
in response to the determining, storing data associated with at least one parameter of the particular ATS device in a local data repository associated with the particular ATS device.

4. The method of claim 2, wherein:
the at least one signal comprises a signal configured to indicate that the ATS device is communicatively coupled in series to at least one other device over the communication network; and
the ATS device is configured to send the at least one signal to the network gateway device responsive to an elapse of a predetermined period of time.

5. The method of claim 2, comprising performing, by at least one computing device:
remotely accessing a read-only display interface with at least some part of the ATS device, wherein the read-only display interface provides read-only access to at least some data associated with at least one parameter of the ATS device.

6. The method of claim 1, wherein, to configure the at least one startup file of the ATS device to implement transmission of at least one signal, based at least in part upon a predetermined trigger, to a network gateway device through the communication network, the at least one program of instructions is executable by each ATS device to:
configure the at least one startup file of the ATS device to transmit a data packet to the network gateway device over the communication network via a Simple Network Management Protocol.

7. The method of claim 1, comprising performing, by at least one computing device:
sending a data packet, over the ring communication network, to a particular next-hop IP address, wherein:
the data packet includes both a target IP address associated with a target of the data packet and the particular next-hop IP address, and
the particular next-hop IP address is a particular IP address assigned to a particular one of the plurality of ATS devices, such that the data packet is sent to the particular ATS device.

8. The method of claim 7, wherein the data packet indicates another next-hop IP address for IP forwarding of data from the particular ATS device and is configured to be processed by the particular ATS device to configure the particular ATS device to forward data communications over the communication network to another one of the plurality of ATS devices assigned the other next-hop IP address.

9. The method of claim 8, further comprising:
sending separate versions of the data packet to each of the plurality of ATS devices over the communication network, wherein each separate version of the data packet sent to each respective ATS device includes a separate next-hop IP address, such that each of the plurality of ATS devices is configured to forward communications in a single direction over the communication network to a separate next-hop ATS device coupled in series with the respective ATS device.

10. A computing device, comprising:
a network interface configured to communicatively couple with a communication network;
one or more processors; and
a persistent memory configured to store a program of instructions that, when executed by the one or more processors, cause the computing device to:
configure at least one local startup file located in persistent memory of the computing device to, upon re-boot of the computing device, enable the computing device to perform network forwarding to a next-hop network address specified in the at least one local startup file, via a ring network of the communication network to another computing device, of data communications received at the network interface over the communication network; and
configure the at least one local startup file to, upon re-boot of the computing device, enable the computing device to log system messages and implement transmission of one or more signals based at least in part on the logged system messages, to a network controller via the communication network, or
monitor the at least one startup file upon re-boot of the computing device, for unauthorized changes to the startup file, and prevent an unauthorized change from being implemented,
wherein responsive to execution of the program of instructions, the computing device is configured to restore the network forwarding, and at least one of logging system messages and the transmission of one or more signals based at least in part on the logged system messages, or monitoring the at least one startup file for unauthorized changes, in response to a re-boot of at least a part of the computing device.

11. The computing device of claim 10, wherein the program of instructions, when executed by the one or more processors, cause the computing device to:
in response to receiving a data packet at the network interface over a portion of the communication network, identify a target network address included in the data packet, wherein the target network address indicates a target recipient of the data packet; and
selectively process or forward the data packet to the next-hop network address over the communication network based at least in part upon a determination of whether the target network address matches a local network address.

12. The computing device of claim 10, wherein the program of instructions, when executed by the one or more processors, further cause the computing device to:
configure at least one startup file located in persistent memory of the computing device to, upon re-boot of the computing device, enable the computing device, in response to receiving a data packet at the network interface over a portion of the communication network, wherein the data packet specifies the next-hop network address, to forward the data packet to the next-hop network address over the communication network.

13. The computing device of claim 10, wherein:
to log system messages comprises to log at least one system message associated with at least one operating parameter, and
transmission of one or more signals to a network controller via the communication network comprises transmission of a log including the at least one system message via a Simple Network Management Protocol.

14. The computing device of claim 10, wherein transmission of one or more signals to the network controller via the communication network comprises transmitting a heartbeat signal to a network gateway device over the communication network, wherein the heartbeat signal indicates that the computing device is communicatively coupled to the communication network.

15. A computing device, comprising:
a network interface configured to communicatively couple in series with a plurality of networking-enabled electronic devices over a communication network that has a ring topology;
one or more processors; and
a memory configured to store a program of instructions that, when executed by the one or more processors, cause the computing device to:
assign an Internet Protocol (IP) address and a next-hop IP address to each electronic device in the communication network, wherein the IP addresses indicate respective electronic devices within the communication network;
generate, for each electronic device, a separate data packet comprising another program of instructions that, when executed by the electronic device, cause the electronic device to:
locally associate the electronic device with the respective assigned IP address;
configure at least one startup file located in persistent memory of the electronic device to enable the electronic device to perform local IP forwarding to forward data communications over the communication network via the ring topology to the next-hop IP address assigned to the electronic device, wherein the next-hop IP address is included in the separate data packet; and
configure the at least one startup file to enable the electronic device to log system messages and transmit one or more signals, based at least in part on the logged system messages, to the computing device via the communication network; or
monitor the at least one startup file for unauthorized changes to the startup file, and prevent an unauthorized change from being implemented, and
transmit each of the separate data packets to corresponding electronic devices over the communication network, wherein the separate data packets are configured to cause the corresponding electronic devices to communicate with the computing device over the communication network.

16. The computing device of claim 15, wherein each separate data packet is configured to be transmitted via a User Datagram Protocol, such that the data packet is configured to be transmitted to a corresponding electronic device without prior communication with the electronic device.

17. The computing device of claim 15, wherein the program of instructions, when executed by the one or more processors, cause the computing device to:
remotely launch a read-only network display interface associated with at least one of the electronic devices, wherein the read-only network display interface provides data associated with at least one parameter of the at least one of the electronic devices, and wherein the remote launching enables remote monitoring of the at least one parameter over the communication network.

18. The computing device of claim 15, wherein the program of instructions, when executed by the one or more processors, cause the computing device to:
based at least in part on receiving a signal from at least one electronic device over the communication network, determine that the at least one electronic device is communicatively coupled to the communication network; and
based at least in part on failing to receive any signal from the at least one electronic device over a particular time interval, determining that the at least one electronic device is decoupled from the communication network.

19. The computing device of claim 18, wherein the program of instructions, when executed by the one or more processors, further cause the computing device to:
in response to determining that the at least one electronic device is decoupled from the communication network, update a next-hop IP address assigned to a preceding electronic device that precedes the at least one electronic device on a data path of the communication network to match an IP address assigned to a subsequent electronic device that follows the at least one electronic device on the data path; and
transmit a data packet indicating the updated next-hop IP address to the preceding electronic device to enable the preceding electronic device to forward communications received over the communication network to the subsequent electronic device.

20. The computing device of claim 15, wherein the program of instructions, when executed by the one or more processors, further cause the computing device to sequentially transmit each of the separate data packets to the corresponding electronic device upon an elapse of a predetermined time interval.

* * * * *